(12) United States Patent
Shahramian et al.

(10) Patent No.: US 10,958,483 B1
(45) Date of Patent: Mar. 23, 2021

(54) METHOD AND APPARATUS FOR DETERMINING A SET OF OPTIMAL COEFFICIENTS

(71) Applicant: HUAWEI TECHNOLOGIES CO., LTD., Guangdong (CN)

(72) Inventors: Shayan Shahramian, Richmond Hill (CA); Ryan Bespalko, Toronto (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/565,849

(22) Filed: Sep. 10, 2019

(51) Int. Cl.
 *H04L 25/03* (2006.01)
 *G06N 3/12* (2006.01)

(52) U.S. Cl.
 CPC ....... *H04L 25/03057* (2013.01); *G06N 3/126* (2013.01); *H04L 2025/03656* (2013.01); *H04L 2025/03675* (2013.01)

(58) Field of Classification Search
 CPC ..... H04L 25/03057; H04L 2025/03656; H04L 2025/03675; G06N 3/126
 See application file for complete search history.

(56) References Cited

U.S. PATENT DOCUMENTS

| | | | | |
|---|---|---|---|---|
| 9,906,384 | B1* | 2/2018 | Rutten | H04L 25/03885 |
| 2003/0005007 | A1* | 1/2003 | Neretti | G06F 17/148 |
| | | | | 708/300 |
| 2005/0063275 | A1* | 3/2005 | Yamamoto | G11B 5/035 |
| | | | | 369/59.22 |
| 2008/0260015 | A1* | 10/2008 | Wang | H04B 10/6971 |
| | | | | 375/232 |
| 2015/0333783 | A1* | 11/2015 | Abe | H03H 17/0213 |
| | | | | 375/285 |

OTHER PUBLICATIONS

Shahramian et al., 1.41pJ/b 56Gb/s PAM-4 Wireline Receiver Employing Enhanced Pattern Utilization CDR and Genetic Adaptation Algorithms in 7nm CMOS, Digest of Technical Papers, 2019 IEEE International Solid-State Circuits Conference, Feb. 20, 2019.

* cited by examiner

*Primary Examiner* — Dac V Ha
(74) *Attorney, Agent, or Firm* — BCF LLP

(57) ABSTRACT

The disclosed systems, structures, and methods are directed to a method for determining a set of N optimal coefficients to be supplied to an equalizer, the equalizer being employed in at least one of a serializer and a deserializer, the method comprising: receiving N different parameters, searching an initial set of N coefficients on an N-dimensional performance surface, in accordance with a genetic algorithm, wherein the N-dimensional performance surface corresponds to various coefficients in the N parameters, and fine tuning the initial set of N coefficients to provide the set of N optimal coefficients, in accordance with a gradient descent algorithm.

19 Claims, 22 Drawing Sheets

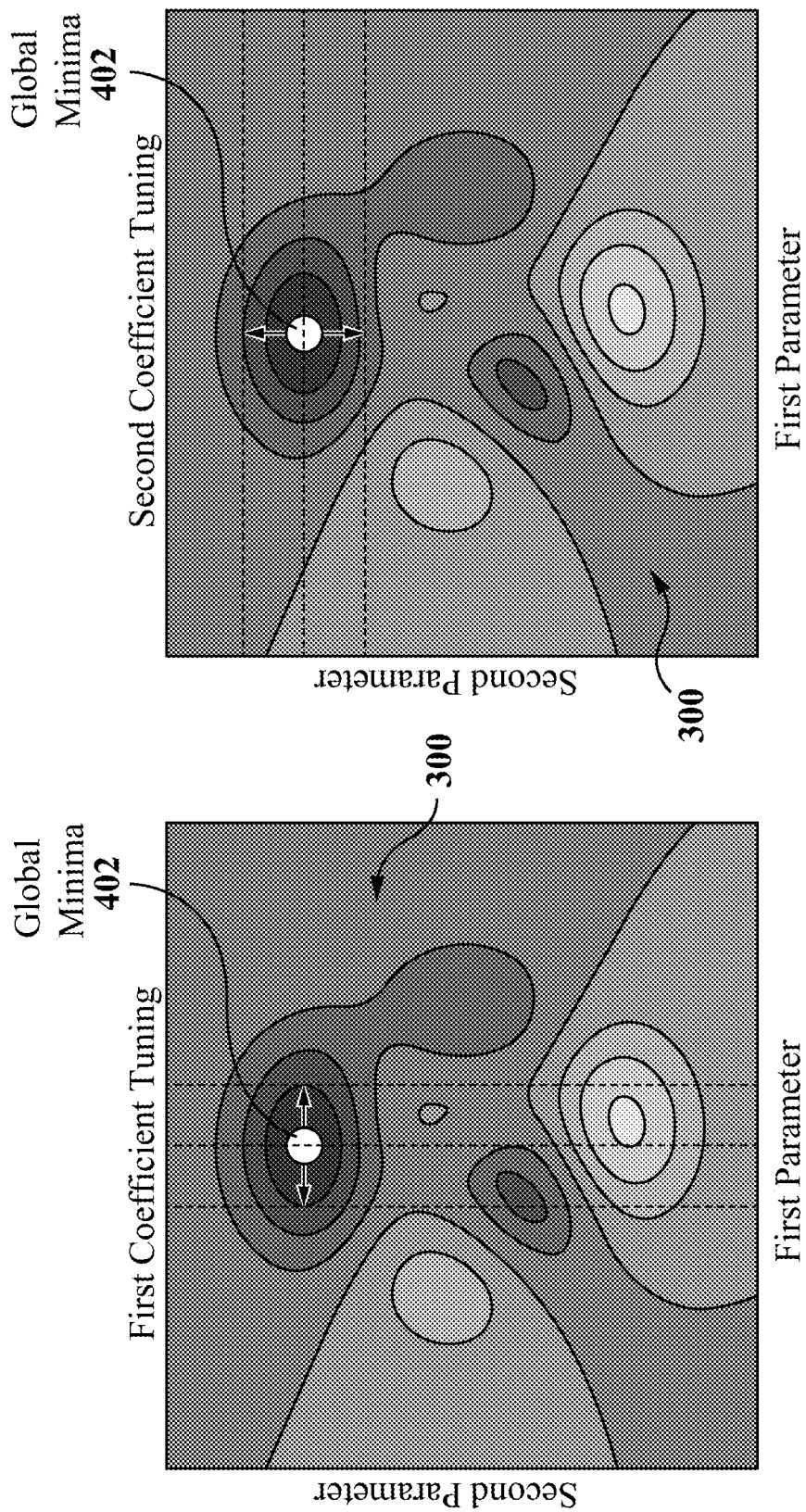

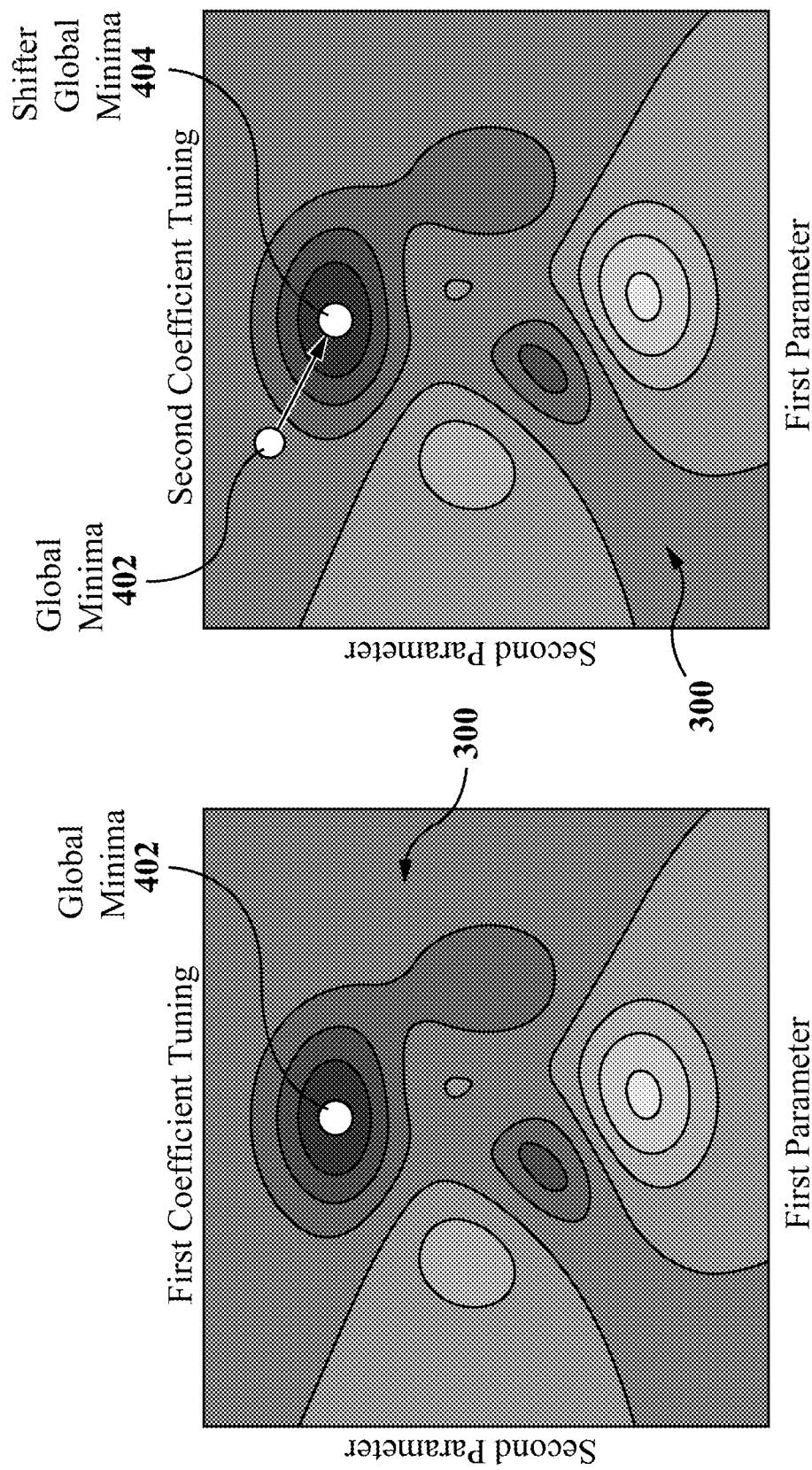

METHOD AND APPARATUS FOR DETERMINING A SET OF OPTIMAL COEFFICIENTS

CROSS-REFERENCE TO RELATED APPLICATIONS

This is the first application filed for the instantly disclosed technology.

FIELD OF THE INVENTION

The present disclosure generally relates to the field of communication networks and, in particular, to methods and systems for determining a set of optimal coefficients.

BACKGROUND

Wireline serial transceivers, such as, for example, serializer/deserializers (SerDes) links are ubiquitous in communication networks, as they operate to connect the processing cores of integrated circuits (ICs) with other elements. In so doing, SerDes links are configured to perform numerous tasks, including channel equalization, clock and data recovery, serialization and deserialization of the output/input data etc. One such task SerDes links perform is to transfer data over a channel. Such data transfer is affected by frequency dependant losses. As such, frequency dependant losses results in inter-symbol interference (ISI) which ultimately degrades the signal quality at a receiver.

Various equalization techniques have been suggested to compensate for this ISI in both transmitter and receiver. In order to provide SerDes links that can operate under different operating conditions, such as different amounts of loss, crosstalk, process, temperature, and voltage supply variations, the SerDes links require an extensive amount of built-in programmability to operate in an optimal manner. The large number of setting options results in a challenging problem to determine an optimal set of coefficients under a specific operating condition.

It will be appreciated that in certain communication networks, gradient descent based algorithms are used to find the optimal coefficients for SerDes links. Such that, these algorithms move along a performance surface in the direction of largest improvement in a cost function. However, these algorithms are extremely sensitive to the initial conditions and can easily get stuck in a local minima, failing to provide an optimal set of coefficients under a specific operating condition resulting in an additional cost in terms of various performance parameters such as power, area etc.

Consequently, there is a need for efficient and economical procedures for finding optimal coefficients for SerDes links.

SUMMARY

An object of the present disclosure is to provide a method for determining a set of N optimal coefficients to be supplied to an equalizer, the equalizer being employed in at least one of a serializer and a deserializer, the method comprising: receiving N different parameters, searching an initial set of N coefficients on an N-dimensional performance surface, in accordance with a genetic algorithm, wherein the N-dimensional performance surface corresponds to various coefficients in the N parameters, and fine tuning the initial set of N coefficients to provide the set of N optimal coefficients, in accordance with a gradient descent algorithm.

In some embodiments of the method, wherein searching the initial set of N coefficients further comprises: randomly selecting k sets of coefficients from the N parameters, selecting first top sets $s_1$ of coefficients from N parameters, in accordance with a cost function, evolving second sets $s_2$ of coefficients in accordance with the first top sets $s_1$ of coefficients, randomly selecting other sets of coefficients in a controlled random manner and providing third sets $s_3$ of coefficients, wherein the third sets $s_3$ of coefficients includes the first set of coefficients $s_1$ and the second set of coefficients $s_2$ and the other sets of coefficients, randomly selecting fourth m sets $s_4$ of coefficients from the N parameters, providing the initial set of N coefficients in accordance with the third sets $s_3$ of coefficients and the fourth sets $s_4$ of coefficients.

In some embodiments the method further comprising selecting top sets $s_5$ of coefficients from the third sets $s_3$ of coefficients and the fourth sets $s_4$ of coefficients, in accordance with the cost function.

In some embodiments the method further comprising providing the top sets $s_5$ of coefficients in feedback for a next iteration.

In some embodiments the method further comprising providing the initial set of N coefficients based on a particular threshold associated with the cost function.

In some embodiments of the method, wherein the N parameters includes at least one of a low-frequency gain, high-frequency gain, all-pass gain, mid-band frequency, mid-band resistance, squelch, resistor trim, and receiver termination.

In some embodiments of the method, wherein the sets $s_1$ of coefficients includes top three sets.

In some embodiments of the method, wherein the cost function is a vertical eye opening.

In some embodiments of the method, wherein the second sets $s_2$ of coefficients is evolved in accordance with a weighted mean corresponding to the first sets $s_1$ of coefficients.

In some embodiments of the method, wherein searching the initial set of N coefficients is performed in a first mode and a second mode.

In some embodiments of the method, wherein the randomly selecting the other sets of coefficients in a controlled manner is in accordance with a range of coefficients.

In some embodiments of the method, wherein the range of coefficients in the first mode is greater than the range of coefficients in the second mode.

In some embodiments of the method, wherein the first mode and the second mode are associated with the genetic algorithm.

In some embodiments of the method, wherein fine tuning of the initial set of N coefficients is performed in a third mode.

In some embodiments of the method, wherein the third mode is associated with the gradient descent algorithm.

In accordance with other aspects of the present disclosure, there is provided a system for determining a set of N optimal coefficients to be supplied to an equalizer, the equalizer being employed in at least one of a serializer and a deserializer, the system comprising: a genetic algorithm module configured to receive N parameters and search an initial set of N coefficients on an N-dimensional performance surface, in accordance with a genetic algorithm, wherein the N-dimensional performance surface corresponds to various coefficients in the N parameters, and a gradient descent algorithm module configured to fine tune the initial set of N coefficients to provide the set of N optimal coefficients, in accordance with a gradient descent algorithm.

In some embodiments of the system, wherein the genetic algorithm module further comprises: a random children selector configured to randomly select k sets of coefficients from the N parameters, an evolution module configured to select first top sets $s_1$ of coefficients in accordance with a cost function and to evolve second sets $s_2$ of coefficients in accordance with the first top set $s_1$ of coefficients, a controlled mutation module configured to randomly select other sets of coefficients in a controlled random manner to provide a third sets $s_3$ of coefficients wherein the third sets $s_3$ of coefficients includes the first set of coefficients $s_1$ and the second set of coefficients $s_2$ and the other sets of coefficients, a random mutation module configured to randomly select fourth m sets $s_4$ of coefficients from the N parameters, and a top children selector module configured to provide the initial set of N coefficients in accordance with the third sets $s_3$ of coefficients and the fourth sets $s_4$ of coefficients.

In some embodiments of the system, wherein the top children selector module is further configured to select top sets $s_5$ of coefficients from the third sets $s_3$ of coefficients and the fourth sets $s_4$ of coefficients, in accordance with the cost function.

In some embodiments of the system, wherein the top children selector module is further configured to provide the top sets $s_5$ of coefficients in feedback to the evolution module for a next iteration.

In accordance with other aspects of the present disclosure, there is provided a non-transitory computer readable storage device on which is embedded computer software, the software comprising a program, the program performing a method for determining a set of N optimal coefficients to be supplied to an equalizer, the equalizer being employed in at least one of a serializer and a deserializer, the method comprising: receiving N different parameters, searching an initial set of N coefficients on an N-dimensional performance surface, in accordance with a genetic algorithm, wherein the N-dimensional performance surface corresponds to various coefficients in the N parameters, and fine tuning the initial set of N coefficients to provide the set of N optimal coefficients, in accordance with a gradient descent algorithm.

In some embodiments of the non-transitory computer readable storage device, wherein searching the initial set of N coefficients further comprises: randomly selecting k sets of coefficients from the N parameters, selecting first top sets $s_1$ of coefficients from N parameters, in accordance with a cost function, evolving second sets $s_2$ of coefficients in accordance with the first top sets $s_1$ of coefficients, randomly selecting other sets of coefficients in a controlled random manner and providing third sets $s_3$ of coefficients, wherein the third sets $s_3$ of coefficients includes the first set of coefficients $s_1$ and the second set of coefficients $s_2$ and the other sets of coefficients, randomly selecting fourth m sets $s_4$ of coefficients from the N parameters, providing the initial set of N coefficients in accordance with the third sets $s_3$ of coefficients and the fourth sets $s_4$ of coefficients.

In accordance with other aspects of the present disclosure, there is provided a hybrid coefficient provider comprising: a genetic algorithm module configured to receive N parameters and search an initial set of N coefficients on an N-dimensional performance surface, in accordance with a genetic algorithm, wherein the N-dimensional performance surface corresponds to various coefficients in the N parameters, and a gradient descent algorithm module configured to fine tune the initial set of N coefficients to provide the set of N optimal coefficients, in accordance with a gradient descent algorithm.

BRIEF DESCRIPTION OF THE FIGURES

The features and advantages of the present disclosure will become apparent from the following detailed description, taken in combination with the appended drawings, in which:

FIGS. 5a-5d illustrate graphical representations of the performance surface with two parameters being adjusted during the various stages of operations of the gradient descent algorithm module, in accordance with various embodiments of the current disclosure;

Figure 1:
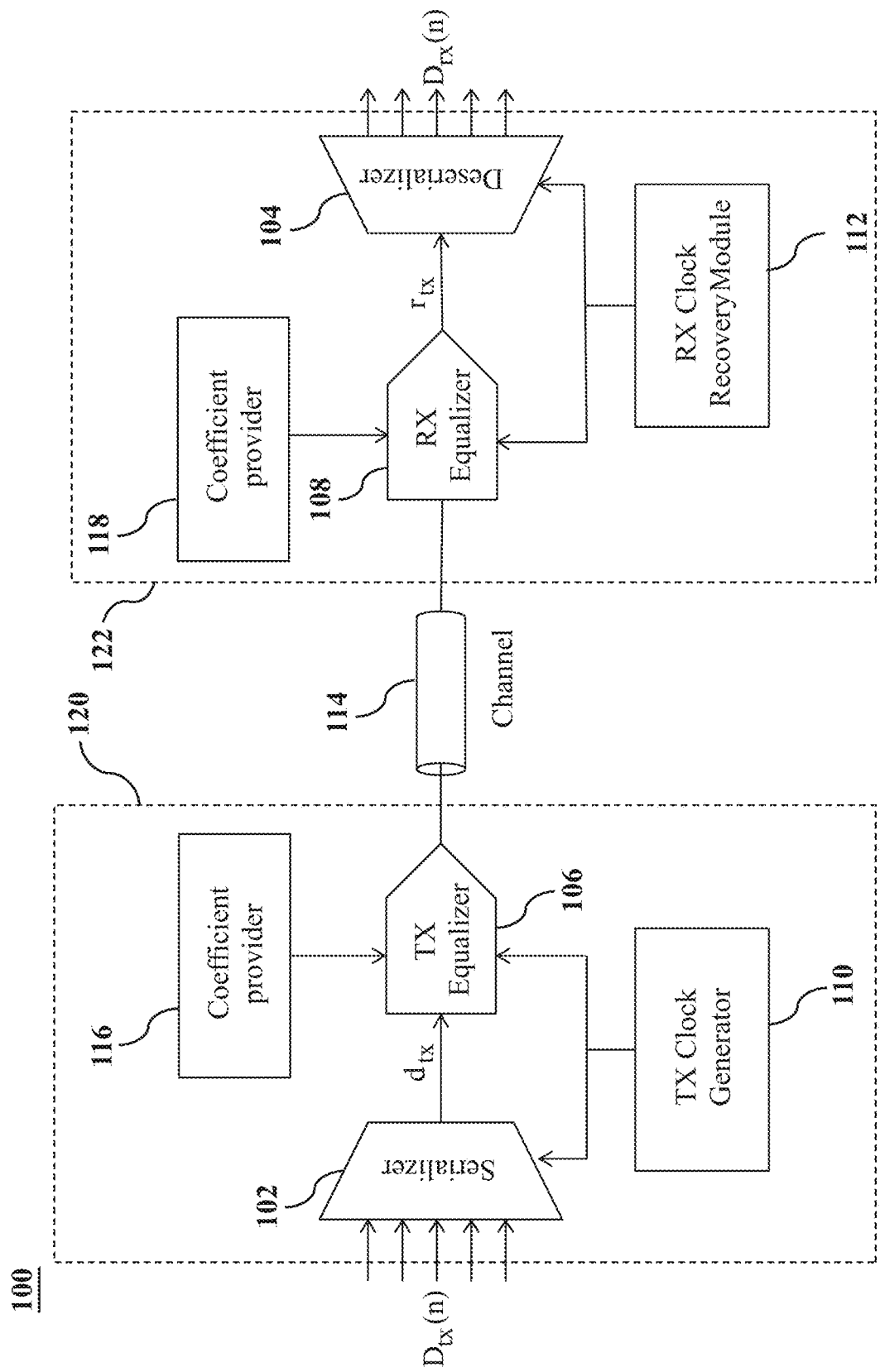
FIG. 1 (Prior Art) depicts a high-level functional block diagram of a conventional communication system.

It is to be understood that throughout the appended drawings and corresponding descriptions, like features are identified by like reference characters. Furthermore, it is also to be understood that the drawings and ensuing descriptions are intended for illustrative purposes only and that such disclosures are not intended to limit the scope of the claims.

DETAILED DESCRIPTION

Unless otherwise defined, all technical and scientific terms used herein have the same meaning as commonly understood by one of ordinary skill in the art to which the described embodiments appertain to.

FIG. 1 (Prior Art) depicts a high-level functional block diagram of a conventional communication system 100. As shown, the conventional communication system 100 employs a transmitter 120, a receiver 122 and a channel 114. The transmitter 120 further employs a serializer 102, a transmitter equalizer 106, a transmitter clock generator 110 and a coefficient provider 116. The receiver 122 further employs a deserializer 104, a receiver equalizer 108, a receiver clock recovery module 112, and a coefficient provider 118. It will be understood that other elements may be present, but are not illustrated for the purpose of tractability and simplicity.

As shown, the transmitter 120 receives M parallel data streams $D_{tx}(n)$ and forward the M parallel data streams $D_{tx}(n)$ to the serializer 102. The serializer 102 converts M parallel data streams $D_{tx}(n)$ into a serial data stream $d_{tx}$ in accordance with a clock signal as supplied by the transmitter clock generator 110. The serial data stream $d_{tx}$ is then supplied to the transmitter equalizer 106. The transmitter equalizer 106 provides equalization to the serial data stream $d_{tx}$ in order to pre-compensate for the losses may occur due to the transmitting channel 114 and extend a channel's maximum data rate.

To this end, the transmitter equalizer 106 is usually implemented as a finite impulse response (FIR) filter by using unit time delay elements, such as, flip-flops and a current steering digital-to-analog circuit (DAC) circuit. The transmitter equalizer 106 pre-distorts the serial data stream $d_{tx}$ over several bit periods in order to invert the channel loss/distortion in accordance with the coefficient supplied by coefficient provider 116 and the clock signal as supplied by the transmitter clock generator 110. As such, the transmitter 120 requires a "back-channel" for adaptation to have some information about the channel back to the transmitter from the receiver 122. In case the transmitter 120 is equipped with back-channel facility (in terms of at least one of the hardware or software), then the adaptation can be performed on the TX side.

Further, the coefficient provider 116 computes an optimum set of coefficients corresponding to various operational parameters of the communication system 100, such as, FIR tap weights (e.g. Pre-cursor weights, post-cursor weights etc.). In order to compute optimum set of coefficients, the coefficient provider 116 is based on a traditional gradient descent based algorithm. Such that, gradient descent based algorithm may be a first-order iterative optimization algorithm for finding a minimum value of a cost function. To find the minimum value of the cost function using gradient descent, the coefficient provider 116 takes steps proportional to the negative of the gradient (or approximate gradient) of the cost function at a current point.

The equalized version of the serial data stream $d_{tx}$ is transmitted over the channel 114 towards the receiver 122. The receiver 122 forwards the received equalized version of the serial data stream $d_{tx}$ to the receiver equalizer 108. The receiver equalizer 108 provides equalization to the received equalized version of serial data stream $d_{tx}$ in order to compensate for the losses occurred due to the transmitting channel 114

The receiver equalizer 108 may be implemented using any suitable techniques such as FIR filtering, decision feedback equalization (DFE) or continuous time linear equalization (CTLE). Usually, CTLE is preferred due to better power efficiency. The receiver equalizer 108 equalizes the received serial data stream $d_{rx}$ to overcome the effect of channel 114 in accordance with the coefficient supplied by the coefficient provider 118 and the clock signal as supplied by the receiver clock recovery module 112.

It will be appreciated that the coefficient provider 118 is based on a traditional gradient descent based algorithm and operates in a similar manner as that of the coefficient provider 116. In so doing, the coefficient provider 118 computes an optimum set of coefficients corresponding to various operational parameters, such as, LFG, HFG, APG, MBF, mid-band resistance (MBR), squelch (SQL), resistor trim (RTRIM), receiver termination (RXTERM) etc.

The equalized serial data stream $r_{rx}$ is supplied to the deserializer 104. The deserializer 104 converts the equalized serial data stream $r_{rx}$ into M parallel data streams $D_{rx}(n)$ in accordance with a clock signal as supplied by the receiver clock recovery module 112.

It is to be noted that although coefficient providers 116 and 118 are based on a traditional gradient descent based algorithm and therefore move along a performance surface in the direction of largest improvement in the cost function. However, coefficient providers 116 and 118 are extremely sensitive to the initial conditions and can easily get stuck in a local minima, failing to provide an optimal set of coefficients under a specific operating condition resulting in an additional cost in terms of various performance parameters such as power, area etc. It should also be understood that in some embodiments, coefficient providers 116 and 118 may be communicatively coupled to each other, either directly or through a controller (not shown for the purpose of simplicity).

Figure 2:
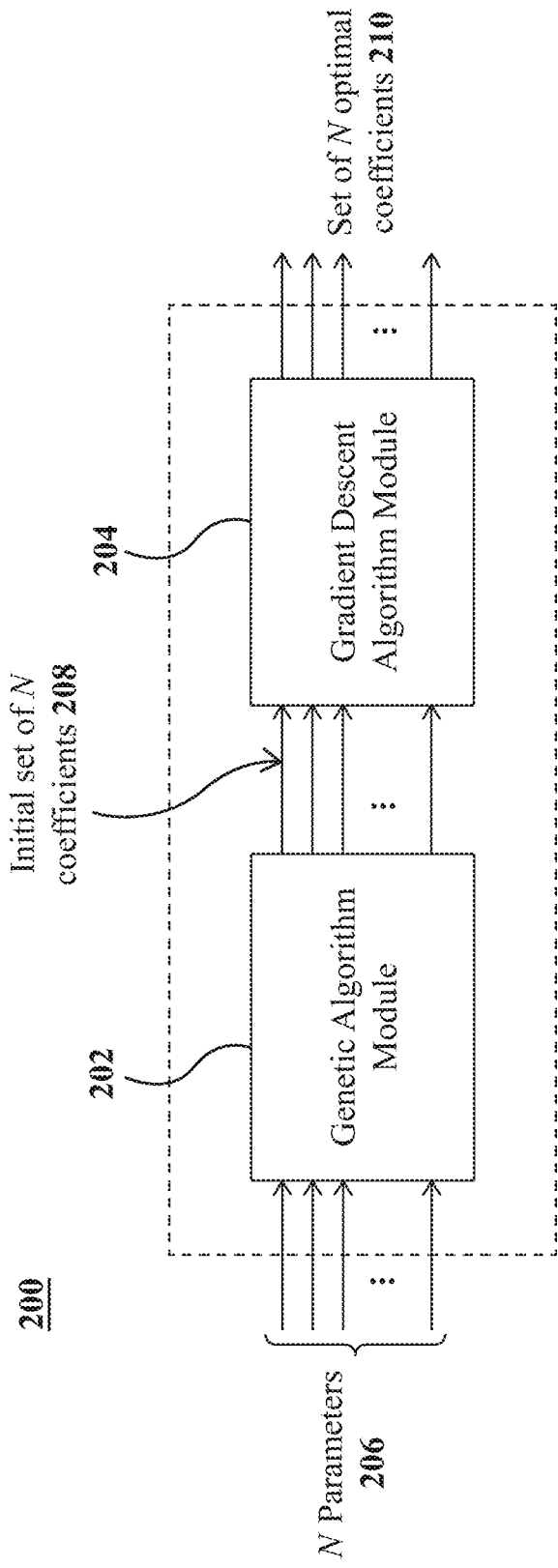
FIG. 2 illustrates a high-level functional block diagram of a hybrid coefficient provider, that may be incorporated in the conventional communication system, directed to find optimum coefficients, in accordance with various embodiments discussed in present disclosure.

To this end, FIG. 2 illustrates a high-level functional block diagram of a hybrid coefficient provider 200 that may be incorporated in the conventional communication system 100, directed to find optimum coefficients, in accordance with various embodiments discussed in present disclosure. As such, the hybrid coefficient provider 200 may replace any one or both coefficient providers 116 and 118, in the conventional communication system 100, to find optimum coefficients for operation of any one or both of the transmitter equalizer 106 and the receiver equalizer 108.

As shown, the hybrid coefficient provider 200 employs a genetic algorithm module 202 and a gradient descent algorithm module 204. It will be understood that other elements may be present, but are not illustrated for the purpose of tractability and simplicity.

As shown, the genetic algorithm module 202 receives N different parameters 206, such as LFG, HFG, APG, MBF, MBR, SQL, RTRIM, RXTERM etc. The genetic algorithm module 202 operates on an N-dimensional performance surface. The N-dimensional performance surface corresponds to different operational coefficients associated with the N parameters 206. In so doing, the genetic algorithm module 202 searches an initial set of N coefficients 208 on the N-dimensional performance surface, in accordance with a genetic algorithm. Further, the initial set of N coefficients 208 is supplied to the gradient descent algorithm module 204. As such, the gradient descent algorithm module 204 operates to fine tune the initial set of N coefficients 208 for the adaptation of the conventional communication system 100 over various factors such as, channel variations, voltage variation, temperature variation etc.

Figure 3:
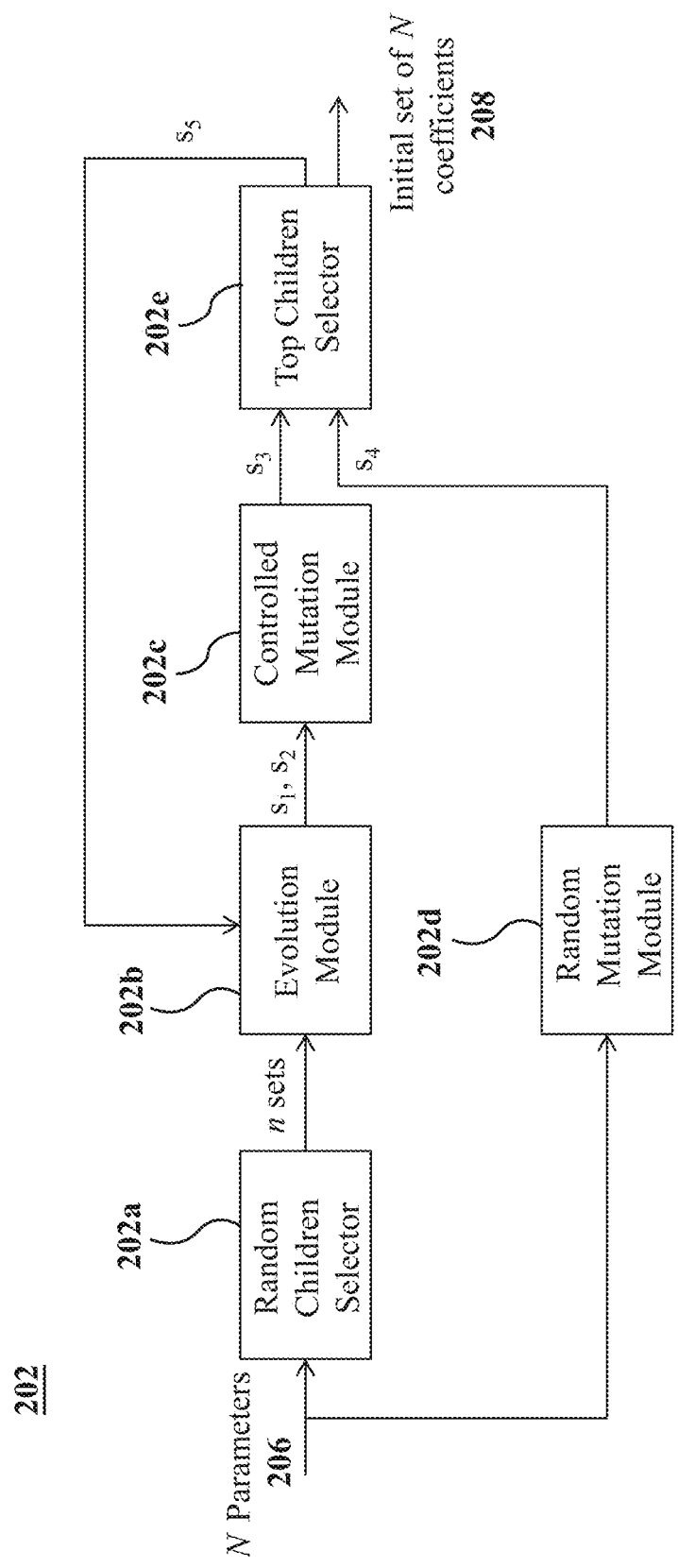
FIG. 3 illustrates an elaborative high-level function block diagram of a genetic algorithm module, in accordance with various embodiments of the present disclosure.

FIG. 3 illustrates an elaborative high-level function block diagram of the genetic algorithm module 202, in accordance with various embodiments of the present disclosure. As shown, the genetic algorithm module 202 employs a random children selector 202a, an evolution module 202b, a controlled mutation module 202c, a random mutation module 202d and a top children selector 202e. It will be understood that other elements may be present, but are not illustrated for the purpose of tractability and simplicity.

The genetic algorithm module 202 operates on received N parameters to find the initial set of N coefficients 208. To this end, the genetic algorithm module 202 operates on various sets of coefficients such as, $s_1$, $s_2$, $s_3$, $s_4$ and $s_5$ at various stages of operation of the genetic algorithm module 202, wherein each one of the sets $s_1$, $s_2$, $s_3$, $s_4$ and $s_5$ further contain a plurality of sets of coefficients associated with the N parameters. Moreover, each set of coefficients may correspond to one possible operational setting associated with the conventional communication system 100.

With this said, the random children selector 202a randomly selects k sets of possible combinations of different coefficients associated with the N parameters 206. It will be appreciated that each one of the N parameters 206 has a plurality of operational coefficients and the combination of different operational coefficients may result in different performance of the conventional communication system 100 in terms of various factors such as bit error rate (BER), receiver eye opening, etc.

The k selected sets are then supplied to the evolution module 202b for selecting top sets $s_1$ of coefficients in accordance with a cost function. In certain embodiments, the cost function may be any suitable performance parameter such as, for example, vertical eye opening, horizontal eye opening, BER etc. Further, the evolution module 202b may select top three sets of coefficients $s_1$ from k sets. However, in certain embodiments any other number of sets may be selected.

With this said, the evolution module 202b further evolves new sets $s_2$ of coefficients. The top three sets $s_1$ of coefficients may be treated as parent sets $s_1$ and the evolution module 202b may compute weighted mean of the parent sets $s_1$ to evolve the new sets $s_2$ of coefficients treated as evolved children $s_2$. The evolved children sets $s_2$ and parent sets $s_1$ are forwarded to the controlled mutation module 202c for further processing.

The controlled mutation module 202c operates on the parent sets $s_1$ and randomly selects other sets of coefficients in a controlled random manner and, the selected sets of coefficients along with the sets of coefficients $s_1$, and $s_2$ are represented as sets $s_3$ of coefficients. As such, for each parent set, the controlled mutation module 202c randomly selects one or more sets of coefficients within a given range of coefficients. It will be appreciated that in certain embodiments, the range of coefficients may be supplied by a controller (not shown for the purpose of simplicity). In parallel, the random mutation module 202d select m sets $s_4$ of possible combinations of different coefficients randomly from the N parameters 206.

Further, the controlled mutation module 202c and the random mutation module 202d supply the sets $s_3$ of coefficients and the random sets $s_4$ of coefficients respectively to the top children selector module 202e. The top children selector module 202e select top sets $s_5$ of coefficients in accordance with the similar cost function as utilized by evaluation module 202b. Also, in certain embodiments, the top children selector module 202e selects top three sets $s_5$ of coefficients from $s_3$ and $s_4$. The selection criteria followed by the top children selector module 202e is similar to the selection criteria followed by the evolution module 202b. However, it will be appreciated that any other number of sets $s_5$ of coefficients $s_5$ may be selected.

The sets $s_5$ of coefficients acts as survivor sets of coefficients in first iteration and are then supplied back to the evolution module 202b for further iterations. To this end, the sets of coefficients $s_5$ acts as new parent sets and the genetic algorithm module 202 performs the same operation for a few more iterations to find the initial set of N coefficients 208. Graphical representations presented below provide performance examples that may be obtained using various numbers of iterations.

In certain embodiments, the top children selector module 202e also compares the cost functions associated with the sets $s_3$ of coefficients and sets $s_4$ of coefficients with a certain threshold to determine if a particular set of coefficients is the initial set of N coefficients 208. Such threshold may be in terms of certain eye opening. It is to be noted that an exact value for threshold can be determined for a specific implementation of an embodiments of the present disclosure and can be set based on experimental results of the embodiments of the present disclosure.

Figure 4A:
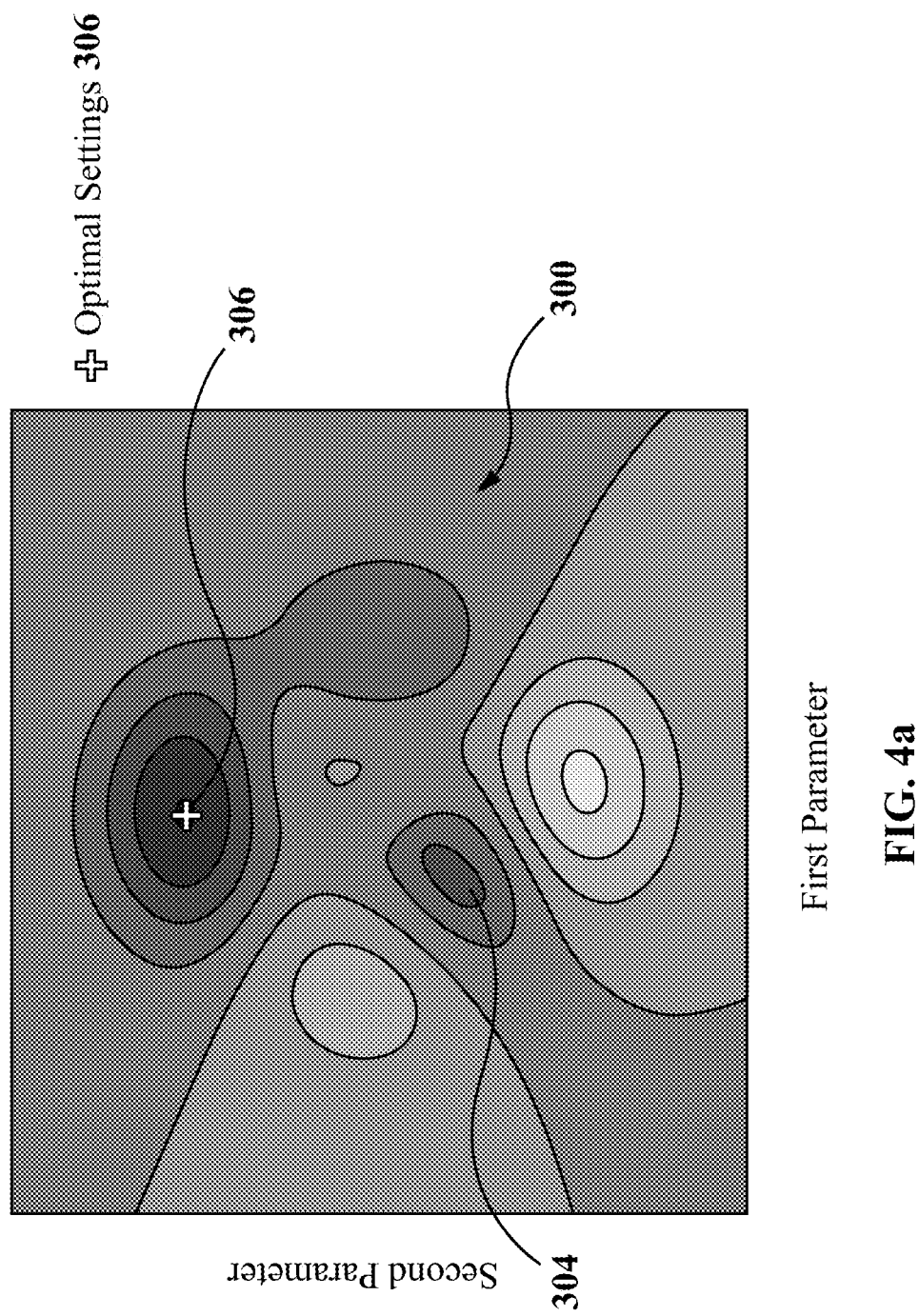
FIGS. 4a-4g illustrate graphical representations of a performance surface with two parameters being adjusted during the various stages of operations of the genetic algorithm module, in accordance with various embodiments of the current disclosure.

FIGS. 4a-4g illustrate results representing a performance surface 300 with two parameters being adjusted during the various stages of operations of the genetic algorithm module 202, in accordance with various embodiments of the current disclosure. As shown, FIG. 4a illustrates a graphical representation of the performance surface 300 with a first parameter on X-axis and a second parameter on Y-axis. Further, the performance surface 300 has, a local minima 304, and a global minima corresponding to an optimal setting 306.

It is to be understood that the values of the local minima 304, and the optimal setting 306 corresponding to the first parameter and the second parameter are subject to performance of the conventional communication system 100 employing the hybrid coefficient provider 200 in terms of the cost function.

Figure 4B:
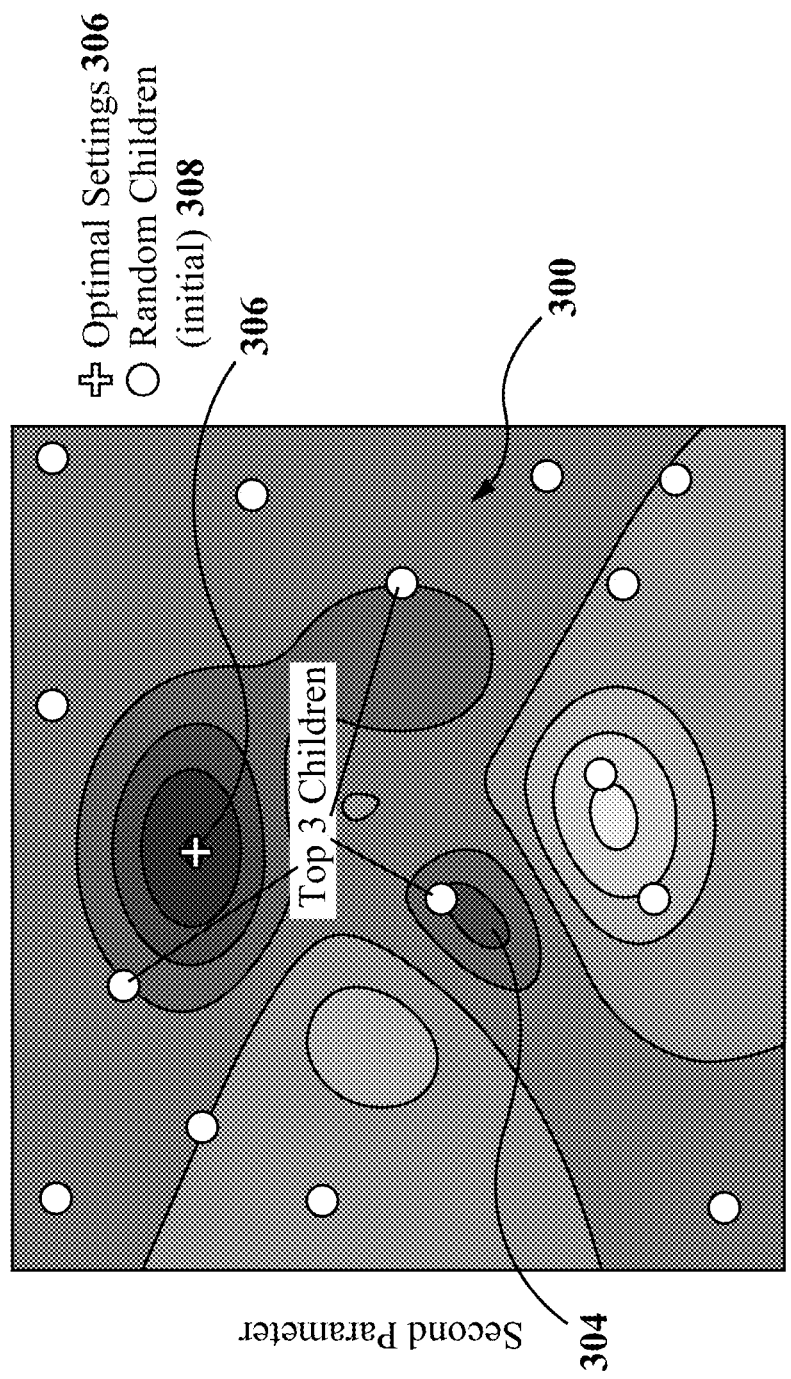

FIG. 4b illustrates a graphical representation corresponding to the functionality of the random children selector 202a along with partial functionality of the evolution module 202b. As shown, the random children selector 202a selects fifteen sets of possible combinations of different coefficients of the first parameter and the second parameter represented as random children (initial) 308, wherein each random child represents a combination of a coefficient of the first parameter and a coefficient of the second parameter.

It is to be noted that the graphical representations by FIGS. 4a-4g are based on vertical eye opening as the cost function. However, any other suitable cost function can also be used for performance evaluation of the selected children. With this said the evolution module 202b then select top three children in accordance with the children having maximum vertical eye openings.

Figure 4C:
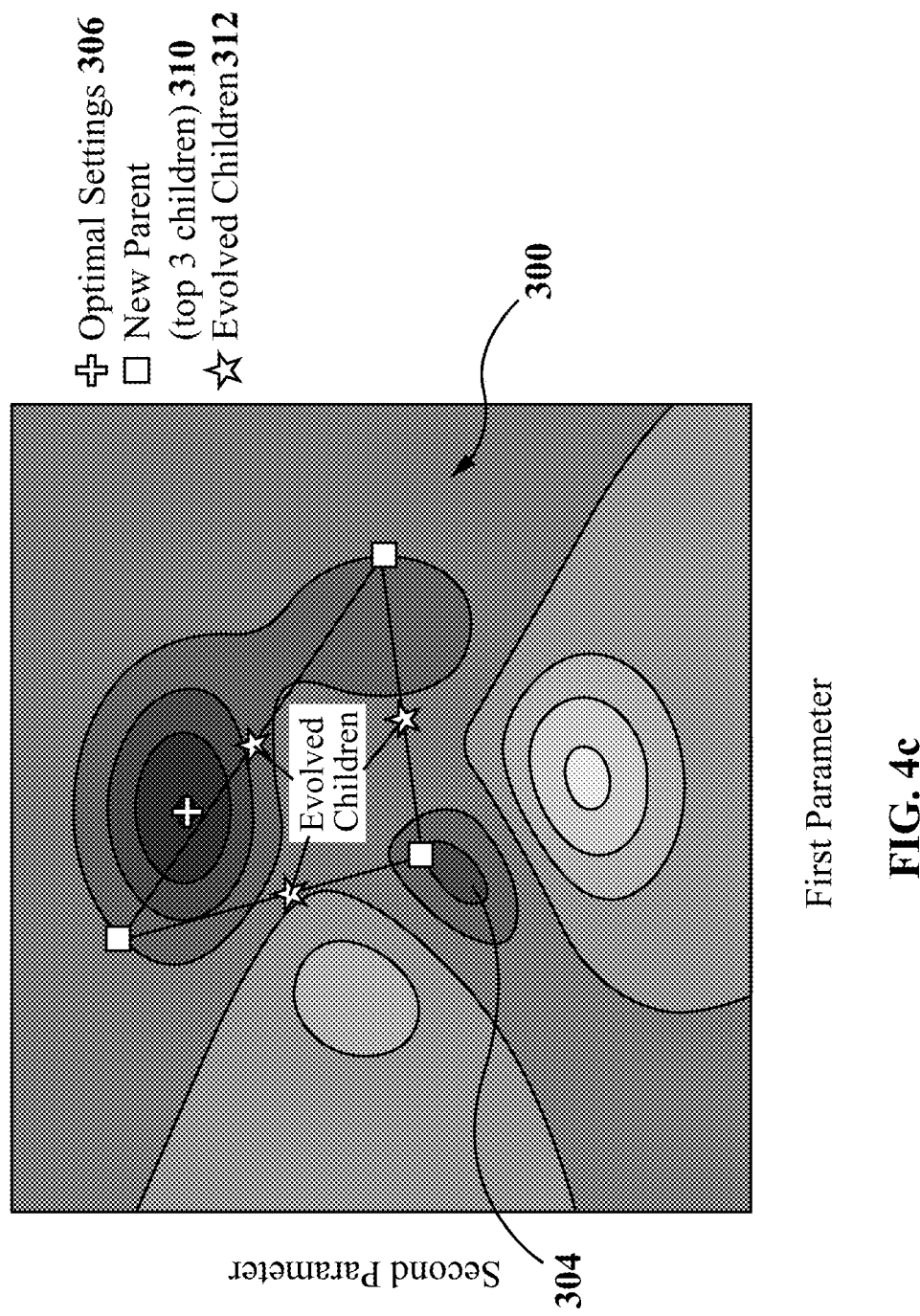

As shown in FIG. 4c, top three children are now represented as new parents 310. Further, the evolution module 202b evolves new sets of coefficients represented as evolved children 312. In so doing, the evolution module 202b may compute weighted mean of adjacent children in the new parents 310 and each weighted mean corresponds to an evolved child in the evolved children 312.

Figure 4D:
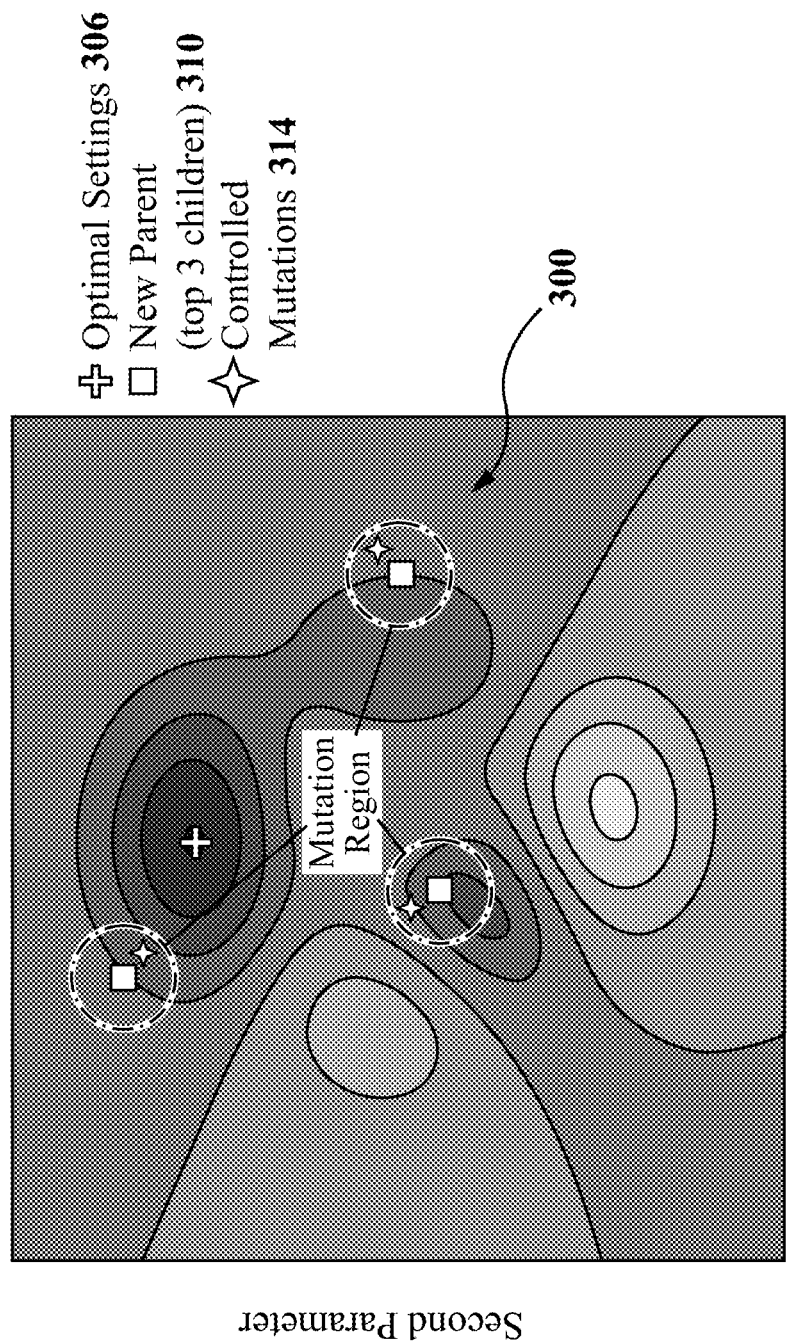

FIG. 4d illustrates that the new parents 310 are further used to generate new sets of coefficients represented as controlled mutation 314. To this end, for each child in new parents 310, the controlled mutation module 202c randomly selects one random child within a given range of coefficients. In certain embodiments, this range may be equal to ±3 or ±1 coefficients depending on mode of operation in which the controlled mutation module 202c is being operated. Such as, for mode 0 the range is ±3 coefficients and for mode 1 the range is ±1. As such, the random child selected by the controlled mutation module 202c may be in the range of ±3 or ±1 coefficients on the X-axis and Y-axis. However, it will be appreciated that the range of coefficients ±3 or ±1 are merely an example and in practical application this range could be any suitable range for such as, for mode 0 the range may be ±4 for mode 1 the range may be ±2. It will be further appreciated that in certain embodiments the range in mode 0 will be greater than the range in mode 1.

Figure 4E:
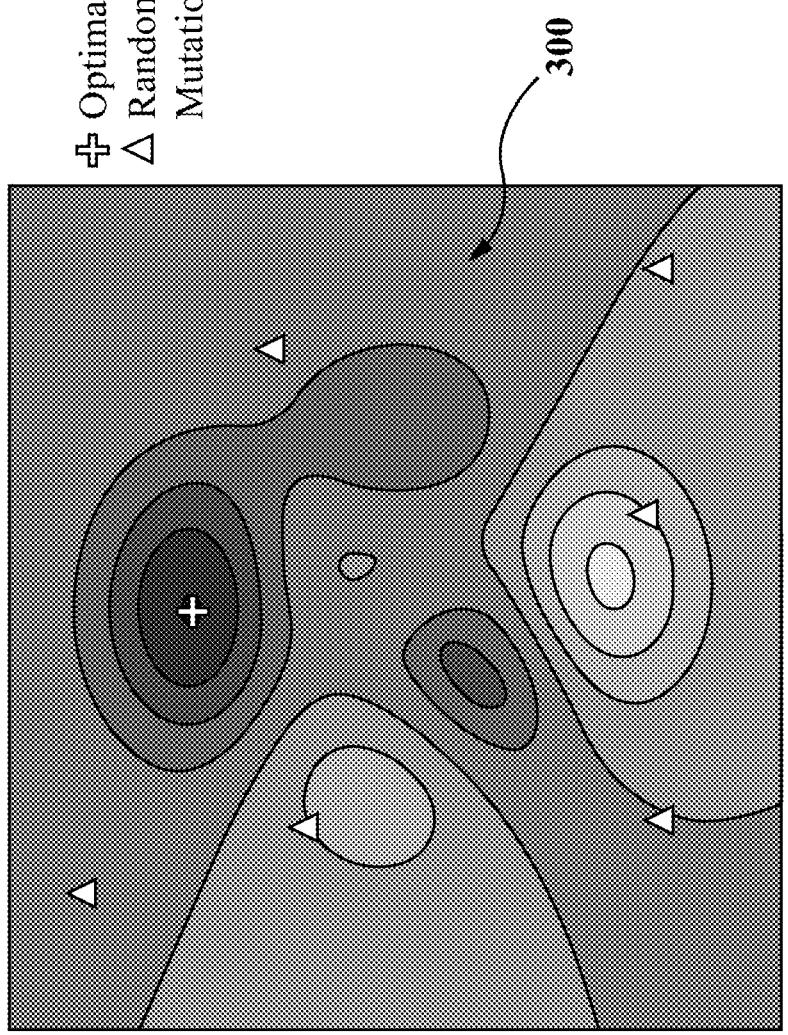

Further, FIG. 4e illustrates a graphical representation of random mutation operation performed by the random mutation module 202d. As shown, the random mutation module 202d randomly selects six sets of possible combinations of different coefficients of the first parameter and the second parameter represented as random mutations 316, wherein each random child in random mutations 316 represents a combination of a coefficient of the first parameter and a coefficient of the second parameter. It is to be noted a child in random mutations 316 may or may not be same as a child in random children (initial) 308 due to randomness in selection.

Figure 4F:
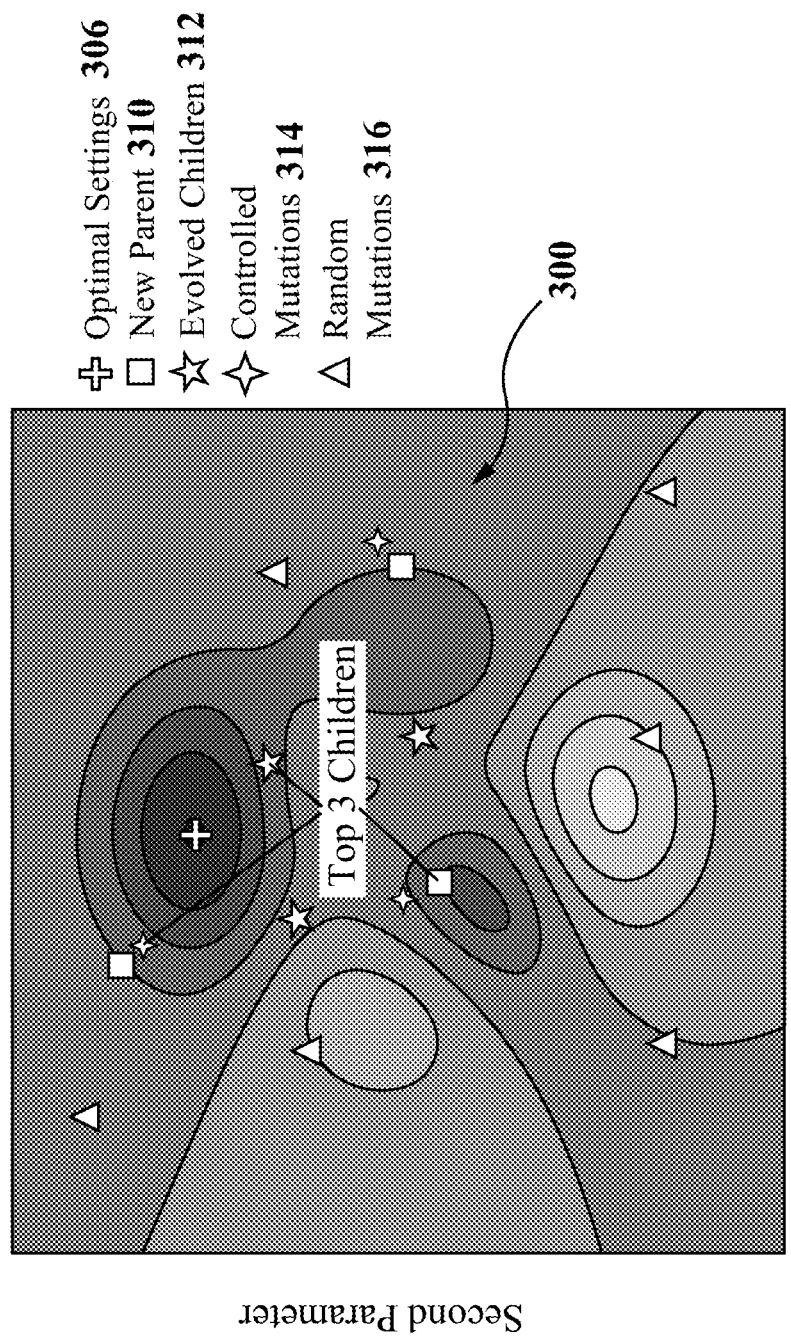
Figure 4G:
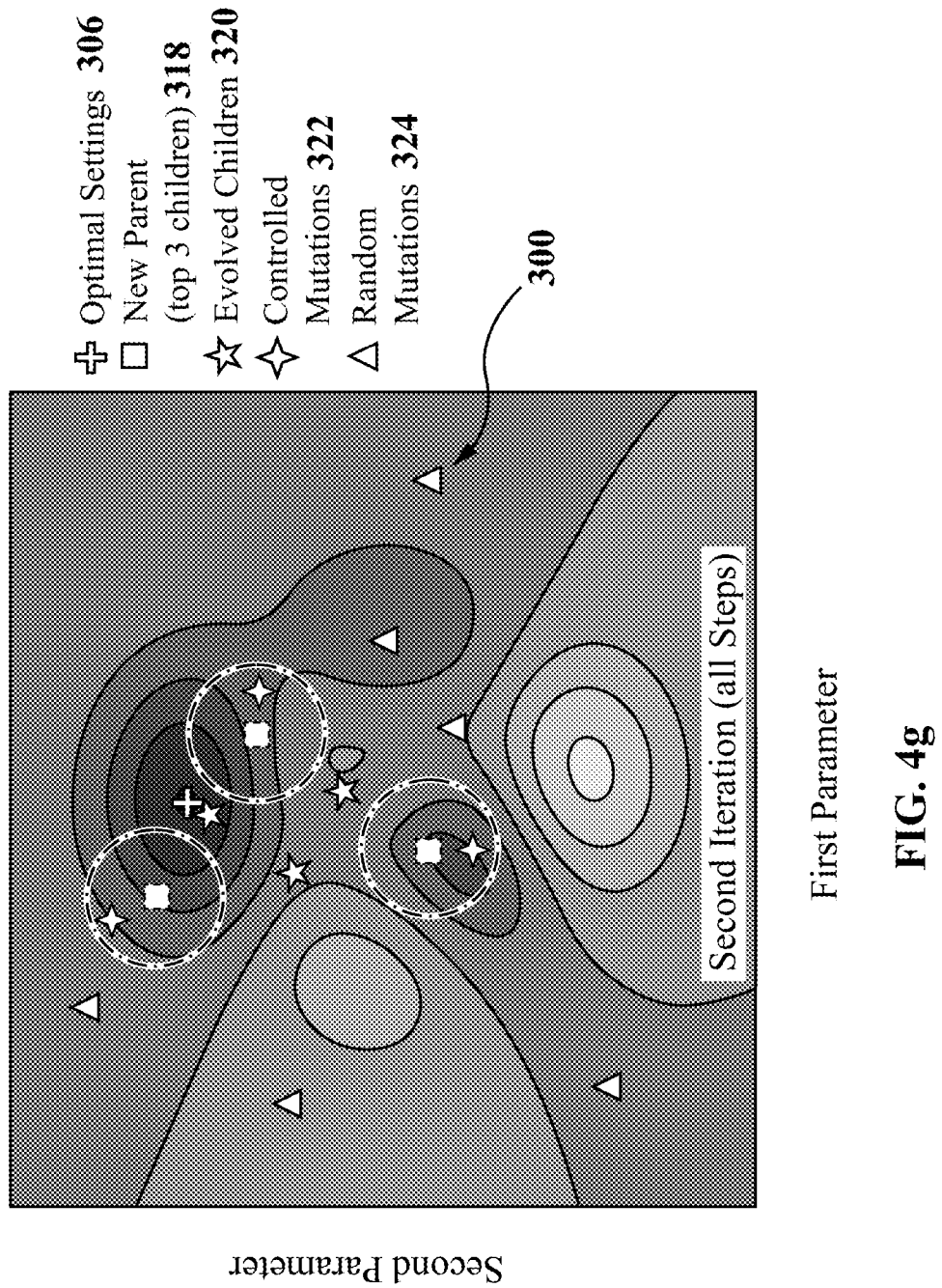

Based on new parents 310, evolved children 312, controlled mutations 314 random mutations 316, as shown in FIG. 4f, the top children selector module 202e selects top three children in accordance with the children having maximum vertical eye openings. Further, as shown in FIG. 4g, the top three children may act as new parents 318 for next iteration and the genetic algorithm module 202 computes a new set of evolved children 320, controlled mutations 322, and random mutations 324 in a similar manner as discussed above.

Returning to FIG. 2, the genetic algorithm module 202 supplies the initial set of N coefficients 208 to the gradient descent algorithm module 204 for further optimization of the initial set of N coefficients 208. In so doing, the gradient descent algorithm module 204 keeps a track for slow varying operating conditions such as variation in supply voltage, variation in temperature etc. in accordance with a gradient descent algorithm, while providing and tuning a set of N optimal coefficients 210.

To this end, FIGS. 5a-5d illustrate results representing a performance surface 300 with two parameters being adjusted during the various stages of operations of the gradient descent algorithm module 204, in accordance with various embodiments of the current disclosure. As shown, FIG. 5a illustrates a graphical representation of tuning of the coefficient corresponding to the first parameter on the performance surface 300. The gradient descent algorithm module 204 varies the optimal coefficient corresponding to the first parameter as supplied by the genetic algorithm module 202 by one unit left or one unit right. Further, the gradient descent algorithm module 204 also evaluates and selects the cost function corresponding to the maximum vertical eye opening.

In a similar manner, FIG. 5b illustrates a graphical representation of tuning of the coefficient corresponding to the second parameter on the performance surface 300. The gradient descent algorithm module 204 varies the optimal coefficient corresponding to the second parameter as supplied by the genetic algorithm module 202 by one unit up or one unit down. Further, the gradient descent algorithm module 204 also evaluates and selects the cost function corresponding to the maximum vertical eye opening.

FIGS. 5c and 5d illustrate a global minima 402 corresponding to the optimal coefficients and a shifted global minima 404 corresponding to change in temperature. It will be appreciated that although FIGS. 4a-4g and FIGS. 5a-5d are simulated for two parameters, however in practical implementation, the hybrid coefficient provider 200 may be capable to optimize coefficients corresponding to N parameters.

FIGS. 6a-6f illustrate representative measurements corresponding to maximum eye opening versus number of iterations (generation) in accordance with the hybrid coefficient provider 200 being operated to optimize seven parameters LFG, HFG, APG, MBF, MBR, SQL, RTRIM, RXTERM under different channel losses, in accordance with various embodiments of the present disclosure.

Figure 6A:
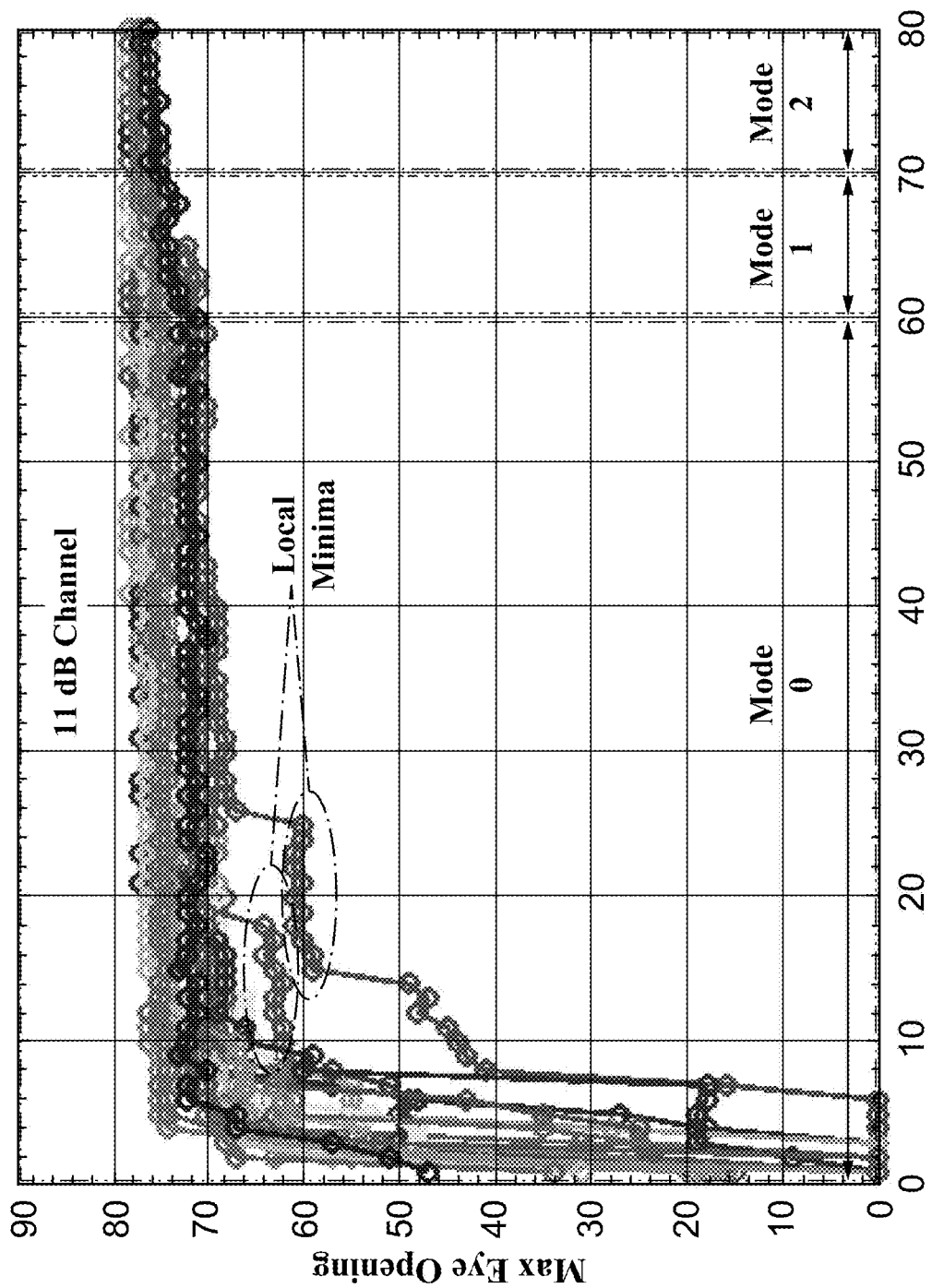
FIGS. 6a-6f illustrate representative measurements corresponding to maximum eye opening versus number of iterations (Generation) in accordance with the hybrid coefficient provider being operated to optimize seven parameters under different channel losses, in accordance with various embodiments of the present disclosure.
Figure 6B:
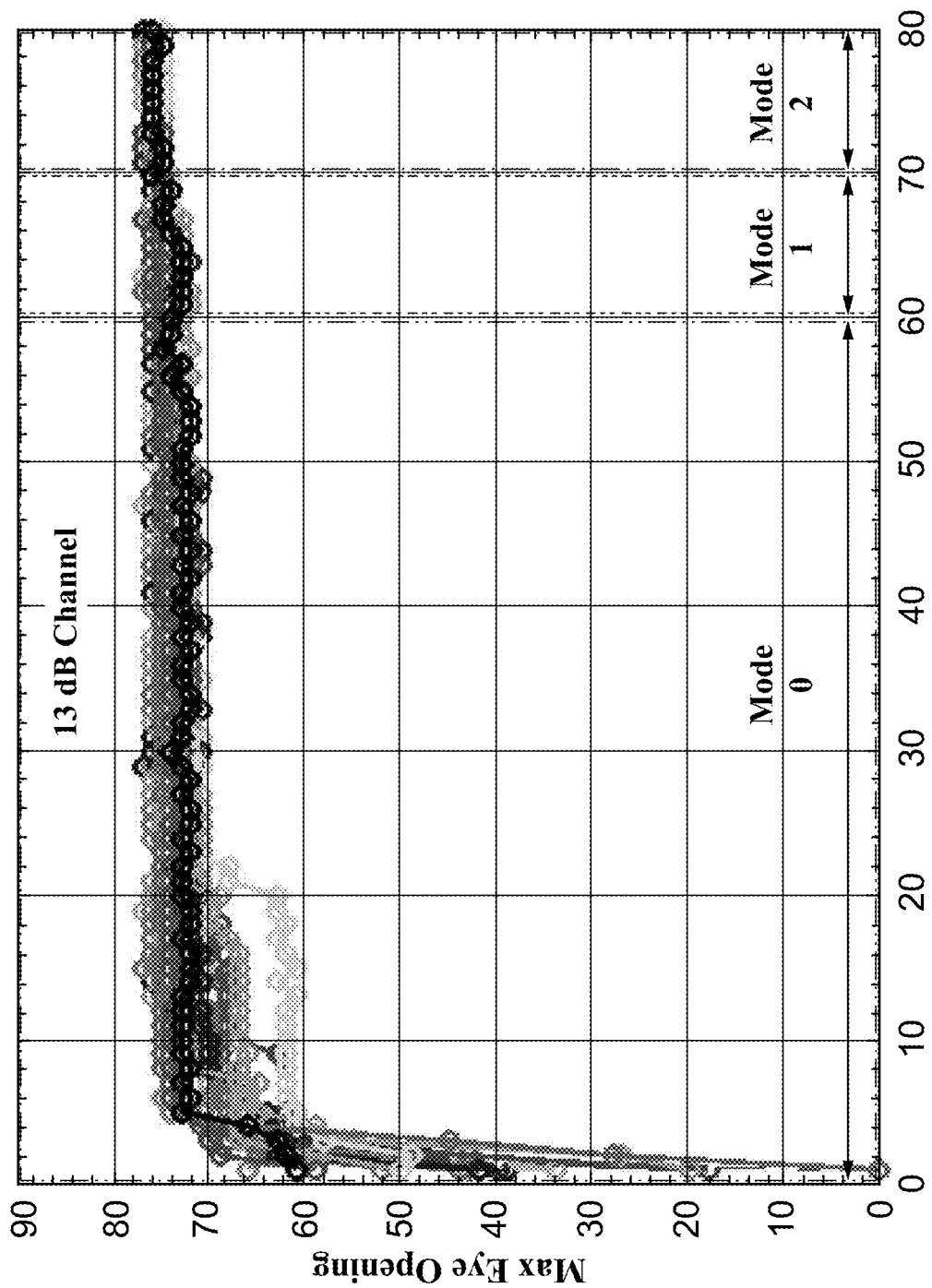
Figure 6C:
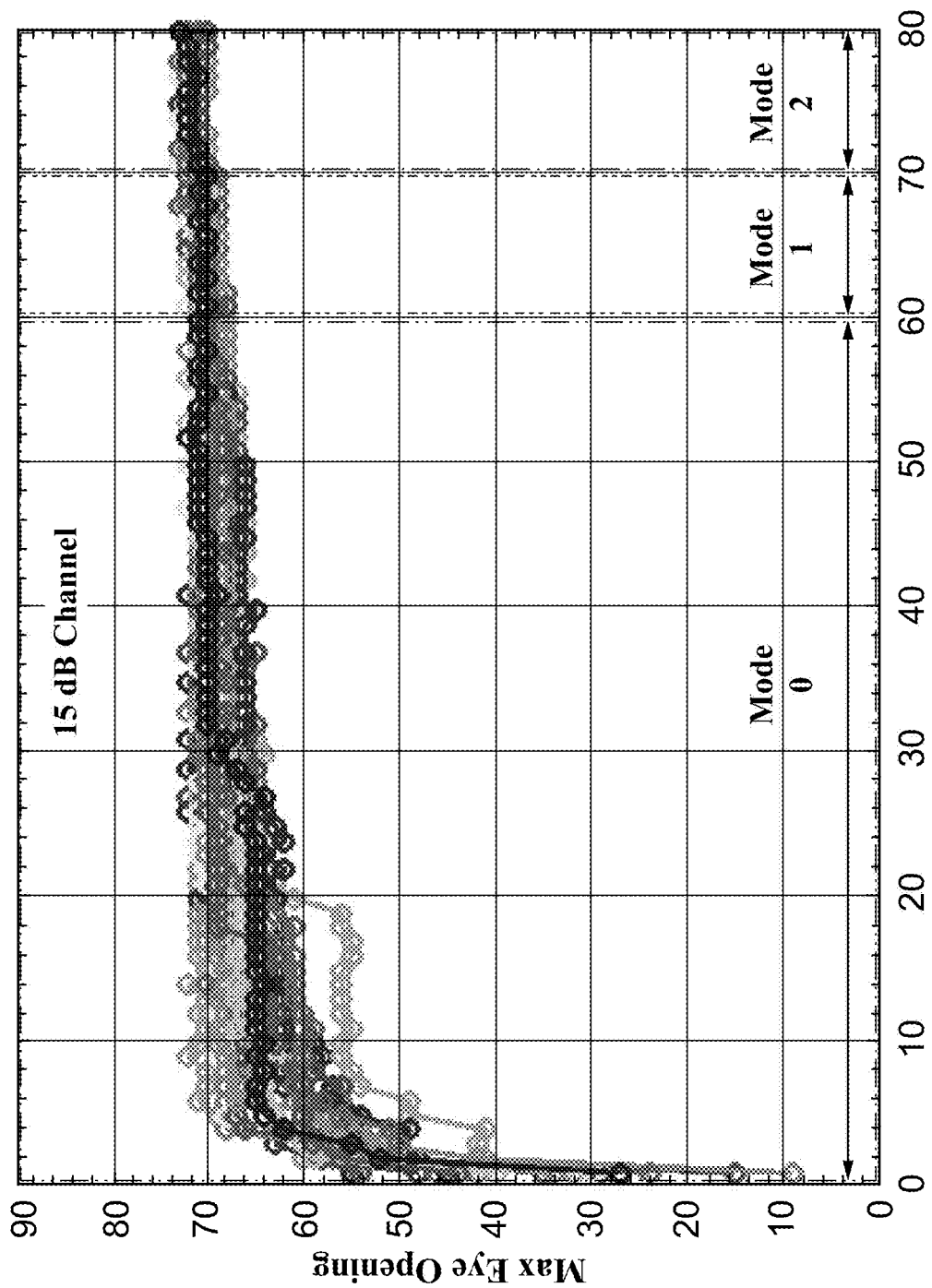
Figure 6D:
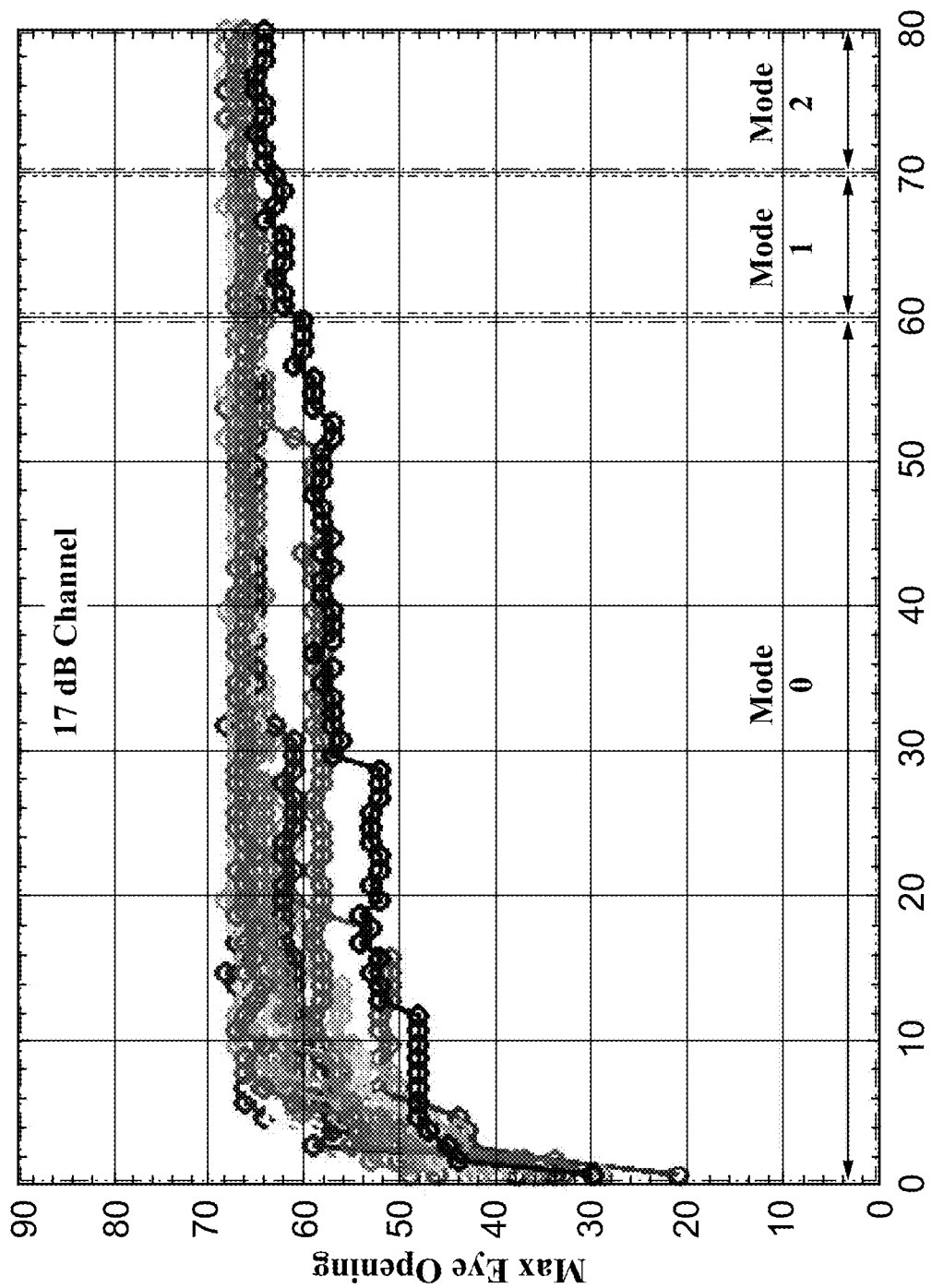
Figure 6E:
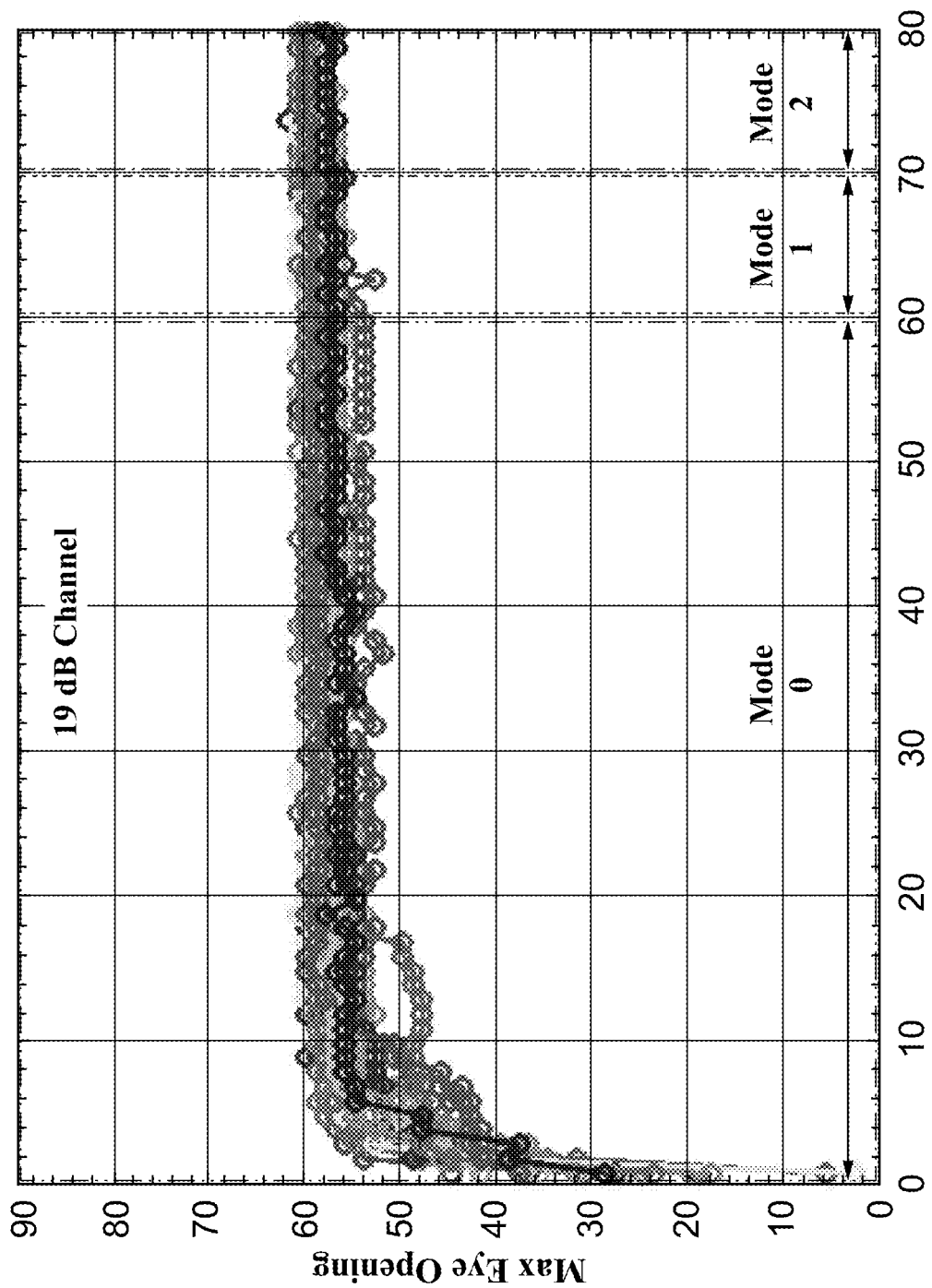
Figure 6F:
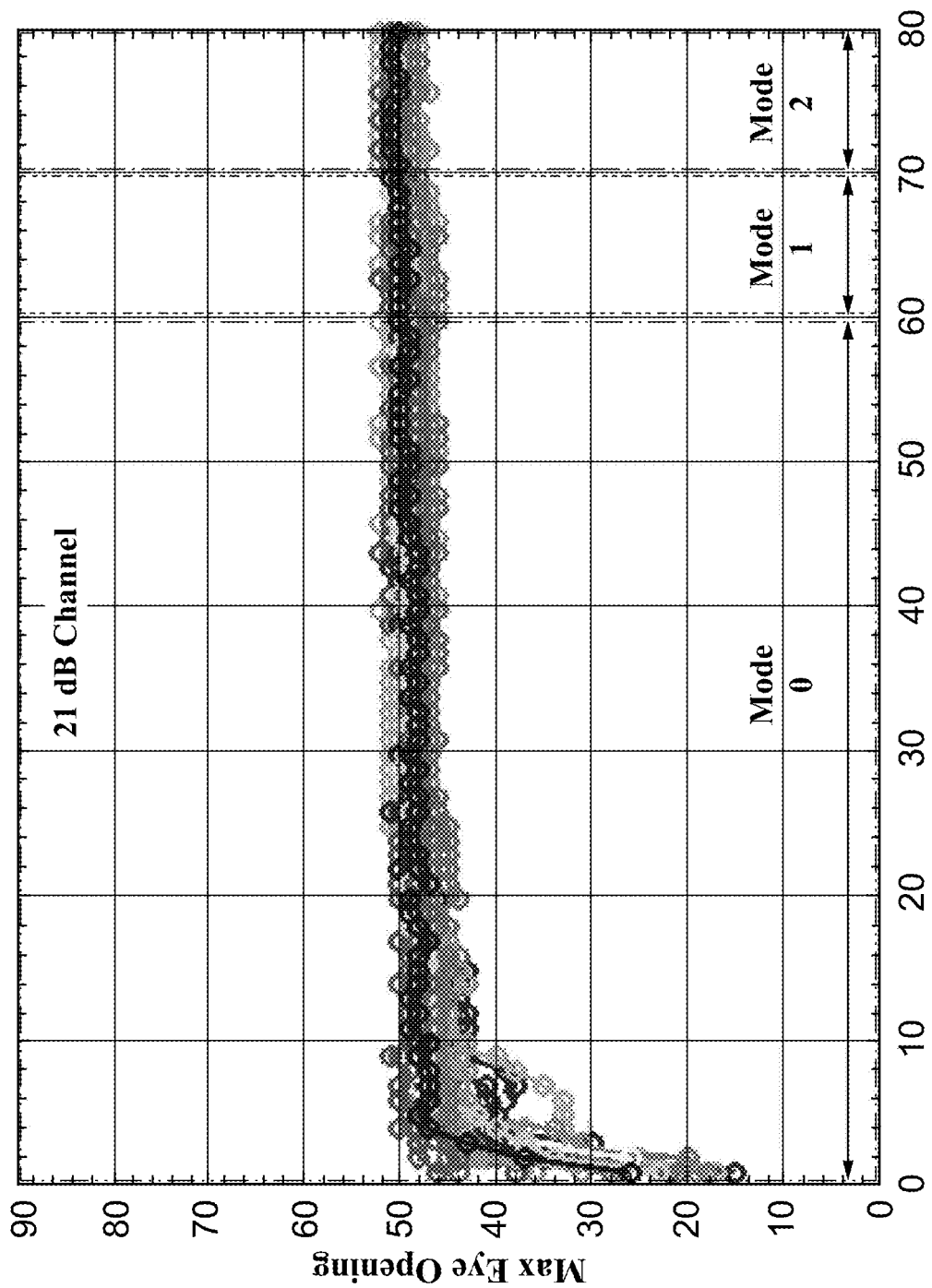

As shown, the representative measurements in FIG. 6a corresponds to twenty times operating the hybrid coefficient provider 200, each time with different random initial conditions having a channel loss of 11 dB. Further, the representative measurements is for eighty iterations (generations) for same random initial conditions. For first sixty iterations (generations), the hybrid coefficient provider 200 being operated under mode 0, for next ten iterations (generations), the hybrid coefficient provider 200 being operated under mode 1, and for remaining iterations (generations), the hybrid coefficient provider 200 being operated under mode 2 (gradient descent).

The hybrid coefficient provider 200 operating under mode 0 uses the genetic algorithm module 202 being operated under a large controlled mutation range of ±3. That is, the controlled mutation module 202c may randomly select one or more random children within a range of ±3 coefficients. Similarly, the hybrid coefficient provider 200 operating under mode 1 uses the genetic algorithm module 202 being operated under a reduced controlled mutation range of ±1. That is, the controlled mutation module 202c may randomly select one or more random children within a range of ±1 coefficients. However, the hybrid coefficient provider 200 operating under mode 2 uses the gradient descent algorithm module 204 to fine tune the initial set of coefficients as supplied by the genetic algorithm module 202.

Each one of the representative measurements in FIGS. 6a-6f correspond to twenty times operating the hybrid coefficient provider 200 with random initial conditions having the channel losses as 11 dB, 13 dB, 15 dB, 17 dB, and 21 dB respectively. Further, as illustrated in FIGS. 6a-6f, even with considerable amount of increase in channel losses, still the hybrid coefficient provider 200 being able to provide an optimal set of coefficients. Such that, the conventional communication system 100 employing the hybrid coefficient provider 200 being able to deliver an acceptable performance in terms of vertical eye opening.

Figures 7A, 7B:
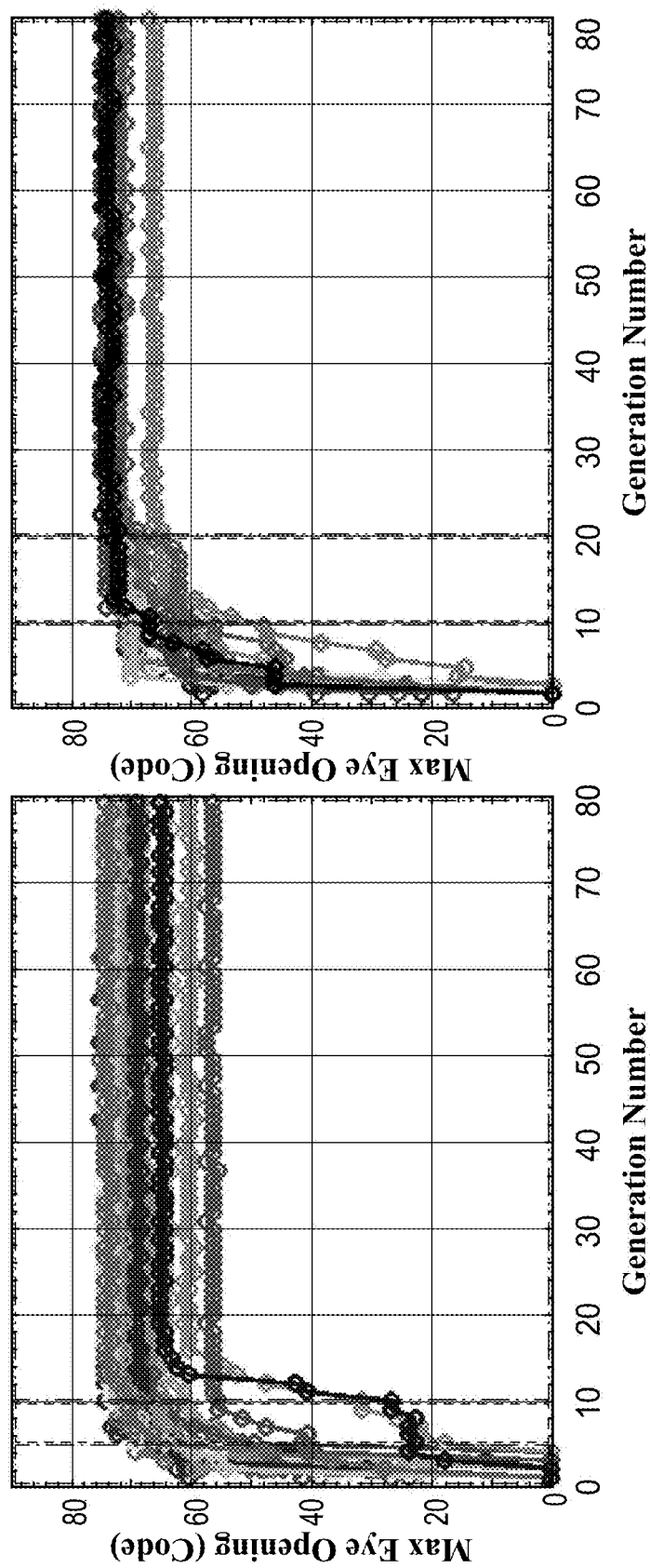
FIGS. 7a-7c illustrates different representative measurement scenarios corresponding to the hybrid coefficient provider being operated under different conditions, in accordance with various embodiments of the present disclosure.
Figure 7C:
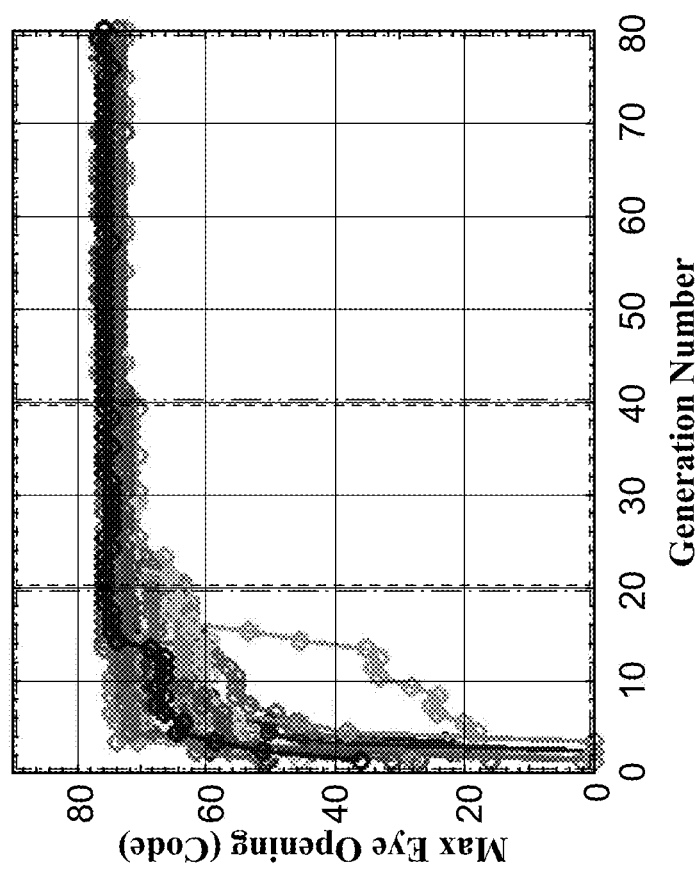

FIGS. 7a-7c illustrate different representative measurements scenarios corresponding to the hybrid coefficient provider 200 being operated under different number of conditions, in accordance with various embodiments of the present disclosure. As shown, FIG. 7a illustrates measurements corresponding to maximum eye opening versus number of iterations (generation) in accordance with the hybrid coefficient provider 200 being operated to optimize seven parameters LFG, HFG, APG, MBF, MBR, SQL, RTRIM, RXTERM, while performing five iterations in mode 0 followed by five iterations in mode 1 and then remaining iterations in mode 2. In so doing, the hybrid coefficient provider 200 may be operated many times, such that each time the hybrid coefficient provider 200 is operated with different random initial conditions.

FIG. 7b illustrates measurements corresponding to the hybrid coefficient provider 200 operated to perform ten iterations in mode 0 followed by ten iterations in mode 1 and then remaining iterations in mode 2. Similarly, FIG. 7c illustrates measurements corresponding to the hybrid coefficient provider 200 operated to perform ten iterations in mode 0 followed by ten iterations in mode 1 and then remaining iterations in mode 2.

The number of iterations in mode 0, mode 1 and mode 2 depends on the number of parameters and their corresponding coefficients. By increasing the number of iterations is mode 0 and mode 1 may allow the hybrid coefficient provider 200 to perform a better searching on a performance surface for optimal coefficients. Hence, with increasing the number of iterations within the operational capabilities of the conventional communication system 100 employing the hybrid coefficient provider 200 may results in increasing the randomness and hence the iterations in mode 2 may be reduced to only track the variations due to supply voltages, temperature etc.

With this said, it may be observed in FIGS. 7a-7c, the effect of increasing the number of iterations in mode 0 and mode 1. As shown in FIG. 7a, for the hybrid coefficient provider 200 operated several times, each time with different random initial conditions result in a variation in maximum eye opening corresponding to each random initial condition. However, as shown in FIGS. 7b and 7c, with increase in number of iterations in mode 0 and mode 1 the variation in maximum eye opening corresponding to each random initial condition reduce along with increase in average eye opening for several operation.

Figure 8:
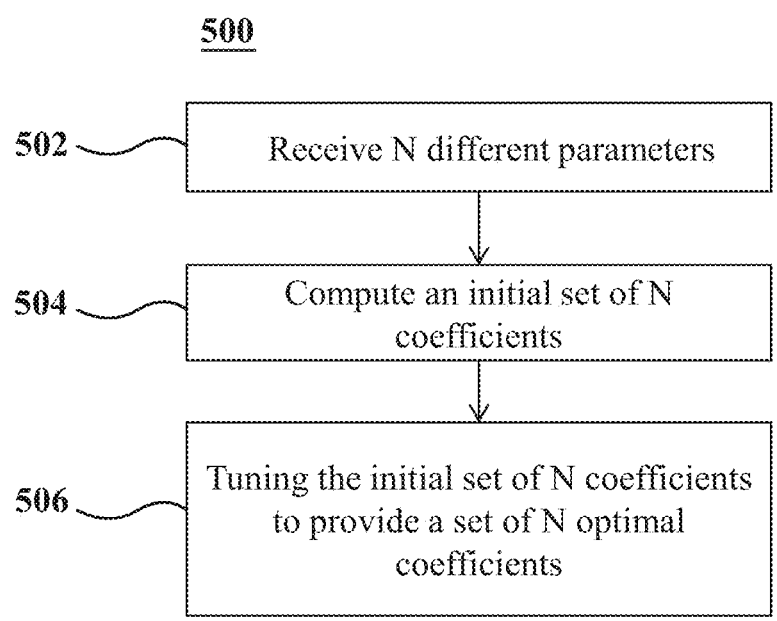
FIG. 8 depicts a functional flow diagram of a method implemented in a hybrid coefficient provider, in accordance with various embodiments of the present disclosure.

FIG. 8 depicts a functional flow diagram of process 500 directed to a method implemented in a hybrid coefficient provider 200, in accordance with various embodiments of the present disclosure.

Process 500 commences at task block 502, where the hybrid coefficient provider 200 receives N different parameters. As discussed above, the hybrid coefficient provider 200 receives N different parameters 206 in order to select optimal coefficient corresponding to each one of the N different parameters 206, such parameters may include LFG, HFG, APG, MBF, MBR, SQL, RTRIM, RXTERM etc.

Process 500 proceeds at task block 504, where the genetic algorithm module 202 may be employed in the hybrid coefficient provider 200 search an initial set of N coefficients on an N-dimensional performance surface, in accordance with a genetic algorithm, wherein the N-dimensional performance surface corresponds to various coefficients in the N parameters. As noted above, the genetic algorithm module 202 operates on an N-dimensional performance surface to provide an initial set of N coefficients 208.

Finally at task block 506, where the gradient descent algorithm module 204 may be employed in the hybrid coefficient provider 200 fine tune the initial set of N coefficients to provide a set of N optimal coefficients, in accordance with a gradient descent algorithm. As described above, the gradient descent algorithm module 204 operates on the initial set of N coefficients 208. In so doing, the gradient descent algorithm module 204 keeps a track for slow varying operating conditions such as variation in supply voltage, variation in temperature etc. in accordance with a gradient descent algorithm, while providing and tuning a set of N optimal coefficients 210.

Figure 9:
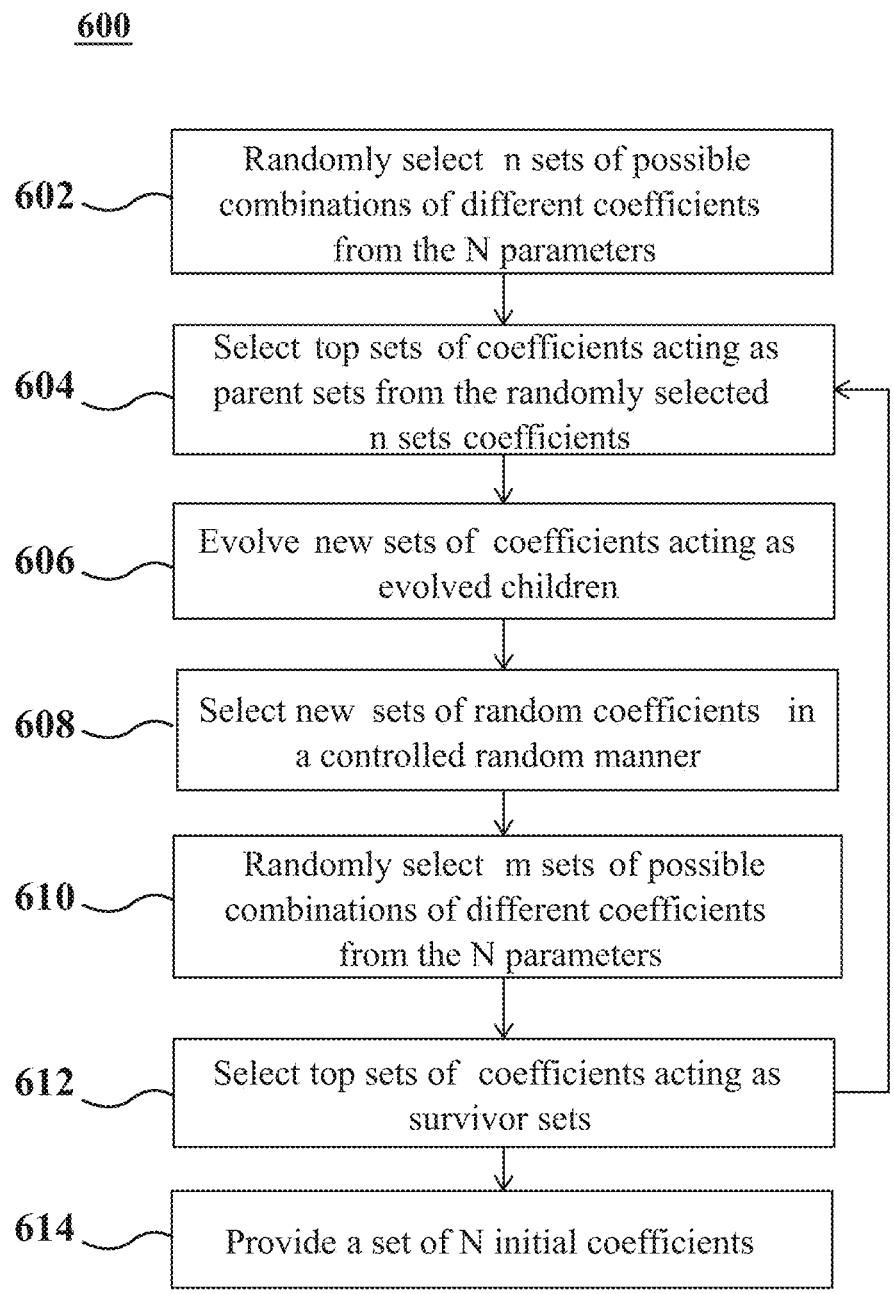
FIG. 9 depicts a functional flow diagram of a method implemented in a genetic algorithm module, in accordance with various embodiments of the present disclosure.

FIG. 9 depicts a functional flow diagram of process 600 directed to a method implemented in a genetic algorithm module 202, in accordance with various embodiments of the present disclosure.

Process 600 starts at task block 602, where the random children selector 202a randomly select k sets of coefficients corresponding to the N parameters. As noted above, where the random children selector 202a randomly select k sets of possible combinations of different coefficients from the N parameters 206.

Process 600 proceeds at task block 604, where the evolution module 202b selects top sets of coefficients in accordance with a cost function. As discussed above, the evolution module 202b selects top sets $s_1$ of coefficients in accordance with a cost function, wherein the cost function may be any suitable performance parameter such as, for example, vertical eye opening, horizontal eye opening, BER etc. In certain embodiments, the evolution module 202b may select top sets $s_1$ three of coefficients acting as parent sets $s_1$. However, any other number of sets may be selected.

At task block 606, the evolution module 202b evolves new sets of coefficients. As described above, the evolution module 202b evolve new sets $s_2$ of coefficients. In so doing, the evolution module 202b may compute weighted mean of the parent sets $s_1$ to evolve the new sets $s_2$ of coefficients treated as evolved children.

Process 600 advances at task block 608, where the controlled mutation module 202c randomly selects other sets of coefficients in a controlled random manner. As discussed above, the controlled mutation module 202c operates on the parent sets $s_1$ and selects other sets of coefficients. Such that, for each parent set, one or more sets of coefficients are selected randomly within a given range of coefficients and the other sets of coefficients along with the sets of coefficients $s_1$, and $s_2$ are represented as new sets of coefficients $s_3$.

Process 600 proceeds at task block 610, where the random mutation module 202d randomly selects m sets $s_4$ of coefficients corresponding to the N parameters. As noted above, the random mutation module 202d select m sets $s_4$ of possible combinations of different coefficients randomly from the N parameters 206.

Process 600 proceeds at task block 612, where the top children selector module 202e select top sets $s_5$ of coefficients in accordance with the cost function. As described above, the top children selector module 202e select top sets of $s_5$ coefficients from $s_3$ and $s_4$, in accordance with the similar cost function as utilized by evaluation module 202b. Further, the sets $s_5$ of coefficients acts as survivor sets of coefficients in first iteration and are then supplied back to the evolution module 202b for further iterations.

Finally at task block 614, where the top children selector module 202e provides an initial set of N coefficients. As explained above, the sets $s_5$ of coefficients acts as new parent sets and the genetic algorithm module 202 performs the same operation for a few more iterations to find the initial set of N coefficients 208.

It will be appreciated that the methods 500 and 600 may also be performed by computer programs, which may exist in a variety of forms both active and inactive. Such as, the computer programs may exist as software program(s) comprised of program instructions in source code, object code, executable code or other formats. Any of the above may be embodied on a computer readable medium, which include storage devices and signals, in compressed or uncompressed form. Representative non-transitory computer readable storage devices include conventional computer system RAM (random access memory), ROM (read only memory), EPROM (erasable, programmable ROM), EEPROM (electrically erasable, programmable ROM), and magnetic or optical disks or tapes. Representative computer readable signals, whether modulated using a carrier or not, are signals that a computer system hosting or running the computer program may be configured to access, including signals downloaded through the Internet or other networks. Concrete examples of the foregoing include distribution of the programs on a CD ROM or via Internet download. In a sense, the Internet itself, as an abstract entity, is a computer readable medium. The same is true of computer networks in general.

Thus, by virtue of techniques provided by the hybrid coefficient provider 200, an optimal set of coefficients may find in such a manner that initially the genetic algorithm is used to find an initial set of coefficients in a large multi-dimensional performance surface and then tracking slow varying changes and staying in the local minima.

In this manner, using the genetic algorithm along with the gradient descent algorithm assist the hybrid coefficient provider 200 in avoiding the possibility of entirely random set of coefficients during the conventional communication system 100 in operational mode. At the same time, the hybrid coefficient provider 200 also avoids getting stuck in local minima due to initial conditions being random in nature. Thereby, the hybrid coefficient provider 200 significantly improves the performance of the conventional communication system 100 in various parameters such as BER etc.

It is to be understood that the operations and functionality of the described hybrid coefficient provider 200, constituent components, and associated processes may be achieved by any one or more of hardware-based, software-based, and firmware-based elements. Such operational alternatives do not, in any way, limit the scope of the present disclosure.

It will also be understood that, although the embodiments presented herein have been described with reference to specific features and structures, it is clear that various modifications and combinations may be made without departing from such disclosures. The specification and drawings are, accordingly, to be regarded simply as an illustration of the discussed implementations or embodiments and their principles as defined by the appended claims, and are contemplated to cover any and all modifications, variations, combinations or equivalents that fall within the scope of the present disclosure.

What is claimed is:

1. A method for determining a set of N optimal coefficients to be supplied to an equalizer, the equalizer being employed in at least one of a serializer and a deserializer, the method comprising:
    receiving N different operational parameters, each operational parameter including a plurality of coefficients;
    searching an initial set of N coefficients on an N-dimensional performance surface, in accordance with a genetic algorithm, wherein the N-dimensional performance surface corresponds to various coefficients of the N operational parameters, wherein searching the initial set of N coefficients comprises:
        randomly selecting k sets of coefficients from the N operational parameters;
        selecting first top sets $s_1$ of coefficients from N operational parameters, in accordance with a cost function;
        evolving second sets $s_2$ of coefficients in accordance with the first top sets $s_1$ of coefficients;
        randomly selecting other sets of coefficients in a controlled random manner and providing third sets $s_3$ of coefficients, wherein the third sets $s_3$ of coefficients includes the first set of coefficients $s_1$ and the second set of coefficients $s_2$ and the other sets of coefficients;
        randomly selecting fourth m sets $s_4$ of coefficients from the N operational parameters; and
        providing the initial set of N coefficients in accordance with the third sets $s_3$ of coefficients and the fourth sets $s_4$ of coefficients; and
    fine tuning the initial set of N coefficients to provide the set of N optimal coefficients, in accordance with a gradient descent algorithm.

2. The method of claim 1, further comprising selecting top sets $s_5$ of coefficients from the third sets $s_3$ of coefficients and the fourth sets $s_4$ of coefficients, in accordance with the cost function.

3. The method of claim 2, further comprising providing the top sets $s_5$ of coefficients in feedback for a next iteration.

4. The method of claim 3, further comprising providing the initial set of N coefficients based on a particular threshold associated with the cost function.

5. The method of claim 1, wherein the N operational parameters include at least one of a low-frequency gain, high-frequency gain, all-pass gain, mid-band frequency, mid-band resistance, squelch, resistor trim, and receiver termination.

6. The method of claim 1, wherein the sets $s_1$ of coefficients includes top three sets.

7. The method of claim 1, wherein the cost function is a vertical eye opening.

8. The method of claim 1, wherein the second sets $s_2$ of coefficients is evolved in accordance with a weighted mean corresponding to the first sets Si of coefficients.

9. The method of claim 1, wherein searching the initial set of N coefficients is performed in a first mode and a second mode.

10. The method of claim 9, wherein the randomly selecting the other sets of coefficients in a controlled random manner is in accordance with a range of coefficients.

11. The method of claim 10, wherein the range of coefficients in the first mode is greater than the range of coefficients in the second mode.

12. The method of claim 9, wherein the first mode and the second mode are associated with the genetic algorithm.

13. The method of claim 9, wherein fine tuning of the initial set of N coefficients is performed in a third mode.

14. The method of claim 13, wherein the third mode is associated with the gradient descent algorithm.

15. A system for determining a set of N optimal coefficients to be supplied to an equalizer, the equalizer being employed in at least one of a serializer and a deserializer, the system comprising:
    a genetic algorithm module configured to receive N operational parameters, each operational parameter including a plurality of coefficients and search an initial set of N coefficients on an N-dimensional performance surface, in accordance with a genetic algorithm, wherein the N-dimensional performance surface corresponds to various coefficients of the N operational parameters, wherein the genetic algorithm module further comprises:
        a random children selector configured to randomly select k sets of coefficients from the N operational parameters;
        an evolution module configured to select first top sets $s_1$ of coefficients in accordance with a cost function and to evolve second sets $s_2$ of coefficients in accordance with the first top set $s_1$ of coefficients;
        a controlled mutation module configured to randomly select other sets of coefficients in a controlled random manner to provide a third sets $s_3$ of coefficients wherein the third sets $s_3$ of coefficients includes the first set of coefficients $s_1$ and the second set of coefficients $s_2$ and the other sets of coefficients;
        a random mutation module configured to randomly select fourth m sets $s_4$ of coefficients from the N operational parameters; and
        a top children selector module configured to provide the initial set of N coefficients in accordance with the third sets $s_3$ of coefficients and the fourth sets $s_4$ of coefficients; and
    a gradient descent algorithm module configured to fine tune the initial set of N coefficients to provide the set of N optimal coefficients, in accordance with a gradient descent algorithm.

16. The system of claim 15, wherein the top children selector module is further configured to select top sets $s_5$ of coefficients from the third sets $s_3$ of coefficients and the fourth sets $s_4$ of coefficients, in accordance with the cost function.

17. The system of claim 16, wherein the top children selector module is further configured to provide the top sets $s_5$ of coefficients in feedback to the evolution module for a next iteration.

18. A non-transitory computer readable storage device on which is embedded computer software, the software comprising a program, the program performing a method for determining a set of N optimal coefficients to be supplied to an equalizer, the equalizer being employed in at least one of a serializer and a deserializer, the method comprising:
  receiving N different operational parameters, each parameter including a plurality of coefficients;
  searching an initial set of N coefficients on an N-dimensional performance surface, in accordance with a genetic algorithm, wherein the N-dimensional performance surface corresponds to various coefficients of the N operational parameters, wherein searching the initial set of N coefficients further comprises:
    randomly selecting k sets of coefficients from the N operational parameters;
    selecting first top sets $s_1$ of coefficients from N operational parameters, in accordance with a cost function;
    evolving second sets $s_2$ of coefficients in accordance with the first top sets $s_1$ of coefficients;
    randomly selecting other sets of coefficients in a controlled random manner and providing third sets $s_3$ of coefficients, wherein the third sets $s_3$ of coefficients includes the first set of coefficients $s_1$ and the second set of coefficients $s_2$ and the other sets of coefficients;
    randomly selecting fourth m sets $s_4$ of coefficients from the N operational parameters; and
    providing the initial set of N coefficients in accordance with the third sets $s_3$ of coefficients and the fourth sets $s_4$ of coefficients; and
  fine tuning the initial set of N coefficients to provide the set of N optimal coefficients, in accordance with a gradient descent algorithm.

19. A hybrid coefficient provider comprising:
  a genetic algorithm module configured to receive N operational parameters, each operational parameter including a plurality of coefficients, and search an initial set of N coefficients on an N-dimensional performance surface, in accordance with a genetic algorithm, wherein the N-dimensional performance surface corresponds to various coefficients of the N operational parameters, wherein the genetic algorithm module further comprises:
    a random children selector configured to randomly select k sets of coefficients from the N operational parameters;
    an evolution module configured to select first top sets $s_1$ of coefficients in accordance with a cost function and to evolve second sets $s_2$ of coefficients in accordance with the first top set $s_1$ of coefficients;
    a controlled mutation module configured to randomly select other sets of coefficients in a controlled random manner to provide a third sets $s_3$ of coefficients wherein the third sets $s_3$ of coefficients includes the first set of coefficients $s_1$ and the second set of coefficients $s_2$ and the other sets of coefficients;
    a random mutation module configured to randomly select fourth m sets $s_4$ of coefficients from the N operational parameters; and
    a top children selector module configured to provide the initial set of N coefficients in accordance with the third sets $s_3$ of coefficients and the fourth sets $s_4$ of coefficients; and
  a gradient descent algorithm module configured to fine tune the initial set of N coefficients to provide the set of N optimal coefficients, in accordance with a gradient descent algorithm.

* * * * *